US012713265B2

(12) United States Patent
Jeon et al.

(10) Patent No.: US 12,713,265 B2
(45) Date of Patent: Aug. 18, 2026

(54) CSI AND RADIO LINK MONITORING WITH REFERENCE SIGNAL ADAPTATION

(71) Applicant: Samsung Electronics Co., Ltd., Suwon-si (KR)

(72) Inventors: Jeongho Jeon, San Jose, CA (US); Aristides Papasakellariou, Houston, TX (US); Hongbo Si, Allen, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 18/392,180

(22) Filed: Dec. 21, 2023

(65) Prior Publication Data

US 2024/0244467 A1 Jul. 18, 2024

Related U.S. Application Data

(60) Provisional application No. 63/446,222, filed on Feb. 16, 2023, provisional application No. 63/437,896, filed on Jan. 9, 2023.

(51) Int. Cl.
*H04W 24/10* (2009.01)
*H04L 5/00* (2006.01)
*H04W 52/32* (2009.01)

(52) U.S. Cl.
CPC .......... *H04W 24/10* (2013.01); *H04L 5/0053* (2013.01); *H04W 52/325* (2013.01)

(58) Field of Classification Search
CPC ....... H04W 4/40; H04W 24/08; H04W 24/10; H04W 48/16; H04W 52/343; H04W 52/367

(Continued)

(56) References Cited

U.S. PATENT DOCUMENTS 10,542,445 B2 * 1/2020 Yoon .................... H04W 24/10
11,212,686 B2 * 12/2021 Yoon .................... H04W 24/10

(Continued)

FOREIGN PATENT DOCUMENTS

CN 110249657 A * 9/2019 ............ H04W 24/10
CN 120391043 A * 7/2025 ........... H04L 5/0053

(Continued)

OTHER PUBLICATIONS

E. Onggosanusi, M. Zhang, Y. Zhang and J. Kang, "Enhancing 5G MIMO Core Spectral Efficiency with Higher-Resolution Multi-User MIMO and Multi-Beam Operation," in IEEE Communications Standards Magazine, vol. 6, No. 1, pp. 20-26, Mar. 2022, doi: 10.1109/MCOMSTD.0001.2100062. (Year: 2022).*

(Continued)

*Primary Examiner* — William D Cumming

(57) ABSTRACT

A method for a user equipment (UE) is provided. The method includes receiving first information related to reception of reference signals (RSs). The RSs include channel state information RSs (CSI-RS) or synchronization signals. The RSs are associated with a beam failure (BF) detection, a radio link failure (RLF) detection, or a CSI report. The method further includes receiving second information related to hypothetical adaptation of transmission powers of the RSs and the RSs based on the first information. The method further includes determining, based on the second information and the reception of the RSs, reporting quantities indicating hypothetical channel conditions and transmitting a channel with the reporting quantities indicating the hypothetical channel conditions.

20 Claims, 16 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,626,920 | B2 * | 4/2023 | Lee | H04W 4/40 370/329 |
| 11,700,601 | B2 * | 7/2023 | Lee | H04W 52/367 370/329 |
| 2018/0139706 | A1 | 5/2018 | Li | |
| 2019/0200249 | A1 * | 6/2019 | Yoon | H04W 24/08 |
| 2020/0128417 | A1 * | 4/2020 | Yoon | H04W 24/08 |
| 2020/0344019 | A1 | 10/2020 | da Silva et al. | |
| 2020/0359243 | A1 | 11/2020 | Zhou et al. | |
| 2021/0006380 | A1 | 1/2021 | Zhou et al. | |
| 2021/0282143 | A1 * | 9/2021 | Lee | H04W 52/343 |
| 2021/0336688 | A1 * | 10/2021 | Lee | H04W 48/16 |
| 2022/0183075 | A1 | 6/2022 | Jiang | |
| 2024/0244467 | A1 * | 7/2024 | Jeon | H04W 24/10 |

FOREIGN PATENT DOCUMENTS

| | | | | | |
|---|---|---|---|---|---|
| EP | 3579607 | A1 | * | 12/2019 | H04W 24/10 |
| EP | 3369274 | B1 | | 6/2021 | |
| EP | 3579607 | B1 | * | 7/2024 | H04W 72/23 |
| JP | 2019537385 | A | * | 12/2019 | H04W 24/10 |
| JP | 6804649 | B2 | * | 12/2020 | H04W 72/23 |
| KR | 20180101336 | A | * | 9/2018 | H04W 72/23 |
| WO | 2022061649 | A1 | | 3/2022 | |
| WO | WO-2024151005 | A1 | * | 7/2024 | H04W 52/325 |

OTHER PUBLICATIONS

International Search Report and Written Opinion issued Apr. 8, 2024 regarding International Application No. PCT/KR2024/000190, 8 pages.
"3rd Generation Partnership Project; Technical Specification Group Radio Access Network; NR; Physical channels and modulation (Release 17)", 3GPP TS 38.211 V17.2.0, Jun. 2022, 136 pages.
"3rd Generation Partnership Project; Technical Specification Group Radio Access Network; NR; Multiplexing and channel coding (Release 17)", 3GPP TS 38.212 V17.2.0, Jun. 2022, 201 pages.
"3rd Generation Partnership Project; Technical Specification Group Radio Access Network; NR; Physical layer procedures for control (Release 17)", 3GPP TS 38.213 V17.2.0, Jun. 2022, 256 pages.
"3rd Generation Partnership Project; Technical Specification Group Radio Access Network; NR; Physical layer procedures for data (Release 17)," 3GPP TS 38.214 V17.2.0 , Jun. 2022, 228 pages.
5G; NR; Physical layer measurements (3GPP TS 38.215 version 17.1.0 Release 17), ETSI TS 138 215 V17.1.0, Apr. 2022, 32 pages.
"5G; NR; Medium Access Control (MAC) protocol specification (3GPP TS 38.321 version 17.1.0 Release 17)", ETSI TS 138 321 V17.1.0 , Aug. 2022, 244 pages.
"5G; NR; Radio Resource Control (RRC); Protocol specification (3GPP TS 38.331 version 17.1.0 Release 17)", ETSI TS 138 331 V17.1.0, Aug. 2022, 1257 pages.
"5G; NR; Requirements for support of radio resource management (3GPP TS 38.133 version 17.6.0 Release 17)", ETSI TS 138 133 V17.6.0, Sep. 2022, 3348 pages.
Supplementary European Search Report dated Feb. 9, 2026, in connection with European Patent Application No. 24/741,627, 10 pages.

* cited by examiner

CSI AND RADIO LINK MONITORING WITH REFERENCE SIGNAL ADAPTATION

CROSS-REFERENCE TO RELATED APPLICATION AND CLAIM OF PRIORITY

This application claims priority under 35 U.S.C. § 119(e) to U.S. Provisional Patent Application No. 63/437,896 filed on Jan. 9, 2023, and to U.S. Provisional Patent Application No. 63/446,222 filed on Feb. 16, 2023. The above-identified provisional patent application is hereby incorporated by reference in its entirety.

TECHNICAL FIELD

The present disclosure relates generally to wireless communication systems and, more specifically, relates to CSI and radio link monitoring enhancement with reference signal adaptation.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to CSI and radio link monitoring enhancement with reference signal adaptation.

In an embodiment, a method for a user equipment (UE) is provided. The method includes receiving first information related to reception of reference signals (RSs). The RSS include channel state information RSs (CSI-RS) or synchronization signals. The RSs are associated with a beam failure (BF) detection, a radio link failure (RLF) detection, or a CSI report. The method further includes receiving second information related to hypothetical adaptation of transmission powers of the RSs and the RSs based on the first information. The method further includes determining, based on the second information and the reception of the RSs, reporting quantities indicating hypothetical channel conditions and transmitting a channel with the reporting quantities indicating the hypothetical channel conditions.

In another embodiment, a UE is provided. The UE includes a transceiver configured to receive first information related to reception of RSs. The RSs include CSI-RS or synchronization signals. The RSs are associated with a BF detection, a RLF detection, or a CSI report. The transceiver is further configured to receive second information related to hypothetical adaptation of transmission powers of the RSs and the RSs based on the first information. The UE further includes a processor operably coupled with the transceiver. The processor is configured to determine, based on the second information and the reception of the RSs, reporting quantities indicating hypothetical channel conditions. The transceiver is further configured to transmit a channel with the reporting quantities indicating the hypothetical channel conditions.

In yet another embodiment, a base station (BS) is provided. The BS includes a processor and a transceiver operably coupled with the processor. The transceiver is configured to transmit first information related to reception of RSs. The RSs include CSI-RS or synchronization signals. The RSs are associated with a BF detection, a RLF detection, or a CSI report. The transceiver is further configured to transmit second information related to hypothetical adaptation of transmission powers of the RSs, transmit the RSs based on the first information, and receive a channel with reporting quantities indicating hypothetical channel conditions. The reporting quantities are based on the second information and the RSs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
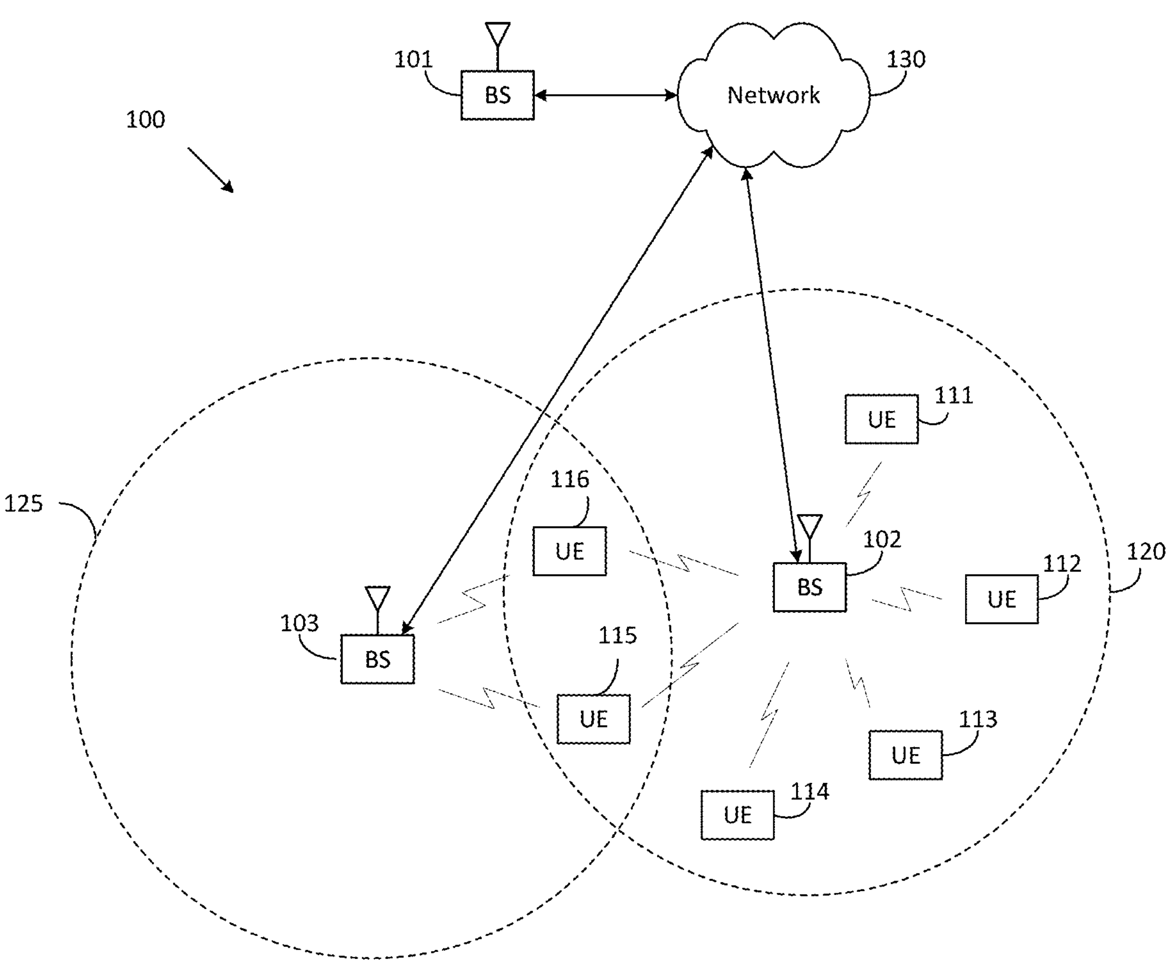
FIG. 1 illustrates an example wireless network according to embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.2.0, "NR; Physical channels and modulation" (REF1); 3GPP TS 38.212 v17.2.0, "NR; Multiplexing and Channel coding" (REF2); 3GPP TS 38.213 v17.2.0, "NR; Physical Layer Procedures for Control" (REF3); 3GPP TS 38.214 v17.2.0, "NR; Physical Layer Procedures for Data" (REF4); 3GPP TS 38.215 v17.1.0, "NR; Physical Layer Measurements" (REF5); 3GPP TS 38.331 v17.1.0, "NR; Radio Resource Control (RRC) Protocol Specification" (REF6); 3GPP TS 38.321 v17.1.0, "NR; Medium Access Control (MAC) protocol specification" (REF7); and 3GPP TS 38.133 v17.6.0, "NR; Requirements for support of radio resource management" (REF8).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

This disclosure relates generally to wireless communication systems and, more specifically, to network energy saving solutions. Network energy saving is important for environmental sustainability, to reduce environmental impact (greenhouse gas emissions), and for operational cost savings. With the ICT industry projected to potentially contribute as much as 20% of the global energy consumption by 2030, communications networks must be attentive to global priorities pertaining to climate change, especially the reduction of energy used by the ICT industry. Also, energy consumption has become a key part of the operators' OPEX. According to the report from GSMA, the energy cost on mobile networks accounts for ~23% of the total operator cost. Most of the energy consumption comes from radio access networks, and, in particular, from the Active Antenna Unit (AAU), with data centers and fiber transport accounting for a smaller share. The power consumption of a radio access network can be split into two parts: a dynamic part which is only consumed when data transmission/reception is ongoing, and a static part which is consumed all the time to maintain the necessary operation of the radio access devices, even when data transmission/reception is not on-going.

As 5G becomes pervasive across industries and geographical areas, handling more advanced services and applications requiring very high data rates (e.g., XR), networks are denser and networks use more antennas, larger bandwidths, and more frequency bands. For example, network densification increases the number of transmission points, higher carrier frequencies lend themselves to larger numbers of antennas, and for the case of higher spectrum bands, e.g., mmW and sub-THz/THz spectrum, the frequencies of operation natural trend towards wider bandwidths resulting in worse impairment characteristics for RF electronics along with higher sampling rates for digital processes and data converters. High clock rates demand power consumption that increases approximately with linear proportionality. This trend will continue in 6G. Therefore, the environmental impact of 5G as well as future 6G needs to stay under control, and novel solutions to improve network energy savings need to be developed. This disclosure recognizes that these solutions could achieve more efficient operation dynamically and/or semi-statically and allow finer granularity adaptation of transmissions and/or receptions in one or more of network energy saving techniques in time, frequency, spatial domains, and power domains, with potential support/feedback from UE, potential UE assistance information, and information exchange/coordination over network interfaces.

Figure 2:
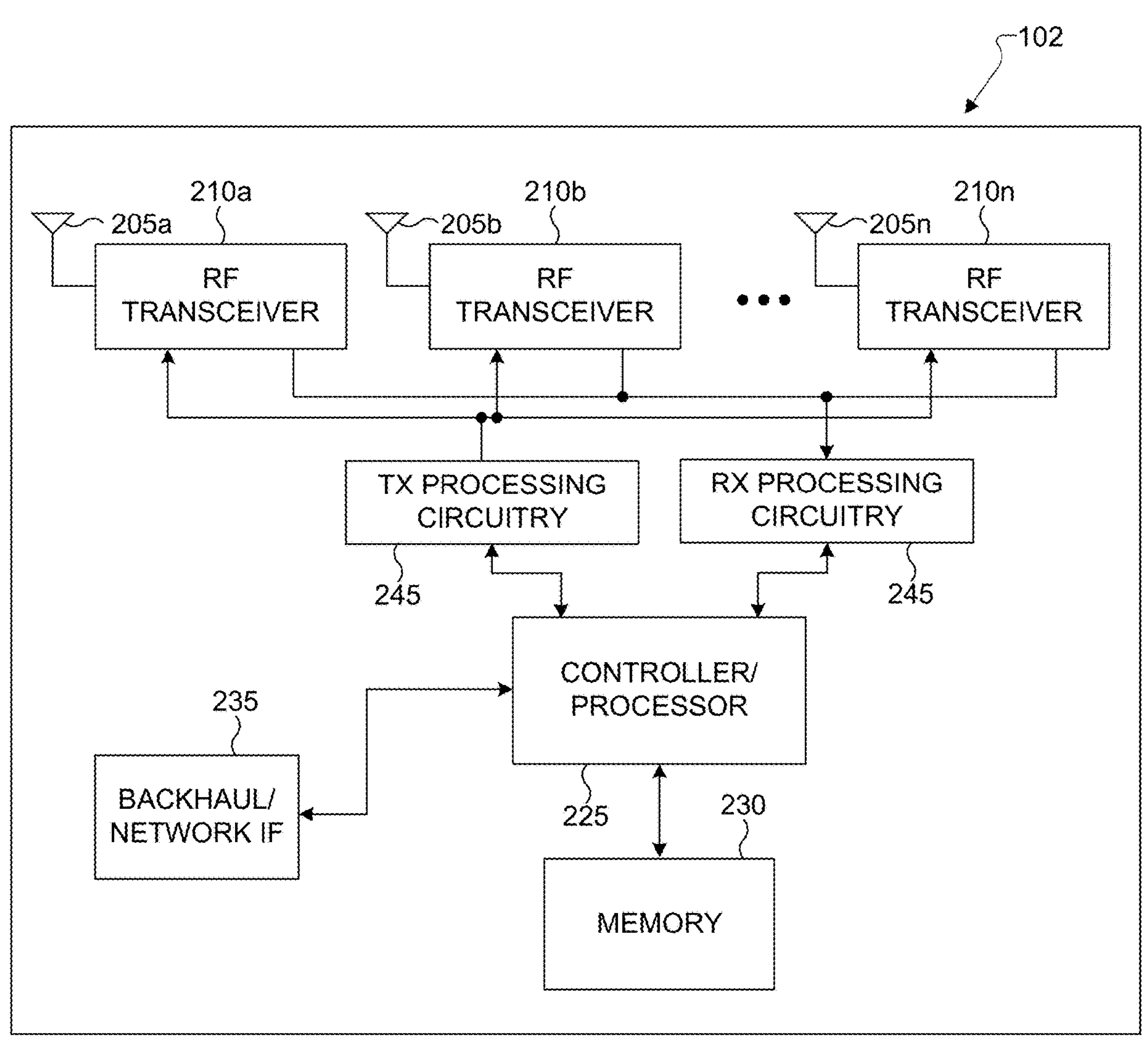
FIG. 2 illustrates an example base station according to embodiments of the present disclosure.
Figure 3:
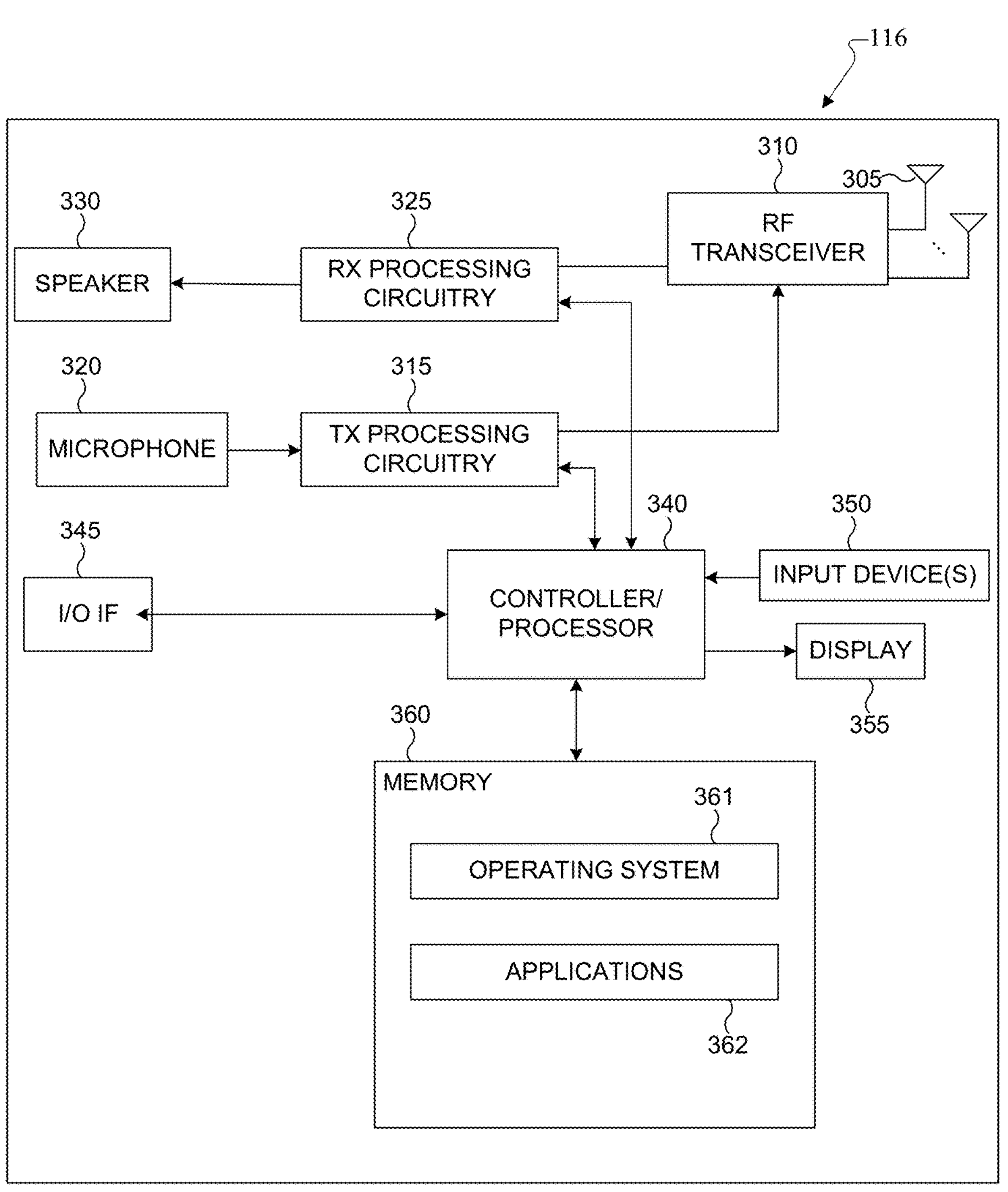
FIG. 3 illustrates an example user equipment (UE) according to embodiments of the present disclosure.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for CSI and radio link monitoring with reference signal adaptation. In certain embodiments, one or more of the BSs 101-103 include circuitry, programing, or a combination thereof facilitate or support CSI and radio link monitoring with reference signal adaptation.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to this disclosure. The embodiment of the gNB 102 shown in FIG. 2 is for illustration only, and other gNBs of FIG. 1 can have the same or similar configuration. However, gNBs come in a wide variety of configurations, and FIG. 2 does not limit the scope of this disclosure to any particular implementation of an gNB. It is noted that gNB 101 and gNB 103 can include the same or similar structure as gNB 102.

As shown in FIG. 2, the gNB 102 includes multiple antennas **205*a*-205*n*, multiple RF transceivers 210*a*-210*n*, transmit (TX) processing circuitry 240, and receive (RX) processing circuitry 245. In certain embodiments, one or more of the multiple antennas 205*a*-205*n* include 2D antenna arrays. The gNB 102 also includes a controller/processor 225, a memory 230, and a backhaul or network interface 235**.

The RF transceivers **210*a*-210*n* receive, from the antennas 205*a*-205*n*, incoming RF signals, such as signals transmitted by UEs or other gNBs. The RF transceivers 210*a*-210*n* down-convert the incoming RF signals to generate IF or baseband signals. The IF or baseband signals are sent to the RX processing circuitry 245, which generates processed baseband signals by filtering, decoding, and/or digitizing the baseband or IF signals. The RX processing circuitry 245 transmits the processed baseband signals to the controller/processor 225** for further processing.

The TX processing circuitry 240 receives analog or digital data (such as voice data, web data, e-mail, or interactive video game data) from the controller/processor 225. The TX processing circuitry 240 encodes, multiplexes, and/or digitizes the outgoing baseband data to generate processed baseband or IF signals. The RF transceivers **210*a*-210*n* receive the outgoing processed baseband or IF signals from the TX processing circuitry 240 and up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 can control the reception of forward channel signals and the transmission of reverse channel signals by the RF transceivers **210*a*-210*n*, the RX processing circuitry 245, and the TX processing circuitry 240 in accordance with well-known principles. The controller/processor 225 can support additional functions as well, such as more advanced wireless communication functions. For instance, the controller/processor 225 can perform the blind interference sensing (BIS) process, such as performed by a BIS algorithm, and decodes the received signal subtracted by the interfering signals. Any of a wide variety of other functions can be supported in the gNB 102 by the controller/processor 225. In some embodiments, the controller/processor 225** includes at least one microprocessor or microcontroller.

The controller/processor 225 is also capable of executing programs and other processes resident in the memory 230, such as a basic OS. The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 can support communications over any suitable wired or wireless connection(s). For example, when the gNB 102 is implemented as part of a cellular communication system (such as one supporting 5G, LTE, or LTE-A), the interface 235 can allow the gNB 102 to communicate with other gNBs over a wired or wireless backhaul connection. When the gNB 102 is implemented as an access point, the interface 235 can allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 can include a RAM, and another part of the memory 230 can include a Flash memory or other ROM.

Although FIG. 2 illustrates one example of an gNB 102, various changes may be made to FIG. 2. For example, the gNB 102 can include any number of each component shown in FIG. 2. As a particular example, an access point can include a number of interfaces 235, and the controller/processor 225 can support routing functions to route data between different network addresses. As another particular example, while shown as including a single instance of TX processing circuitry 240 and a single instance of RX processing circuitry 245, the gNB 102 can include multiple instances of each (such as one per RF transceiver). In embodiments of this disclosure, a gNB, such as gNB 102 illustrated in FIG. 2, supports CSI and radio link monitoring with reference signal adaptation.

FIG. 3 illustrates an example UE 116 according to this disclosure. The embodiment of the UE 116 illustrated in FIG. 3 is for illustration only, and the UEs 111-115 of FIG. 1 can have the same or similar configuration. However, UEs come in a wide variety of configurations, and FIG. 3 does not limit the scope of this disclosure to any particular implementation of a UE.

The UE 116 includes an antenna(s) 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, a input devices 350, a display 355, and a memory 360. The memory 360 includes a basic operating system (OS) program 361 and one or more applications 362.

The RF transceiver 310 receives from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for channel quality measurement and reporting for systems having 2D antenna arrays as described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input devices 350 and the display unit 355. The operator of the UE 116 can use the input devices 350 to enter data into the UE 116. The display 355 may be a liquid crystal display or other display capable of rendering text and/or at least limited graphics, such as from web sites. The memory 360 is coupled to the processor 340. Part of the memory 360 can include a random access memory (RAM), and another part of the memory 360 can include a Flash memory or other read-only memory (ROM).

Although FIG. 3 illustrates one example of UE 116, various changes may be made to FIG. 3. For example, various components in FIG. 3 can be combined, further subdivided, or omitted and additional components can be added according to particular needs. As a particular example, the processor 340 can be divided into multiple processors, such as one or more central processing units (CPUs) and one or more graphics processing units (GPUs). Also, while FIG. 3 illustrates the UE 116 configured as a mobile telephone or smartphone, UEs can be configured to operate as other types of mobile or stationary devices. In embodiments of this disclosure, a UE, such as UE 116 illustrated in FIG. 3, performs CSI and radio link monitoring with reference signal adaptation.

Figure 4A:
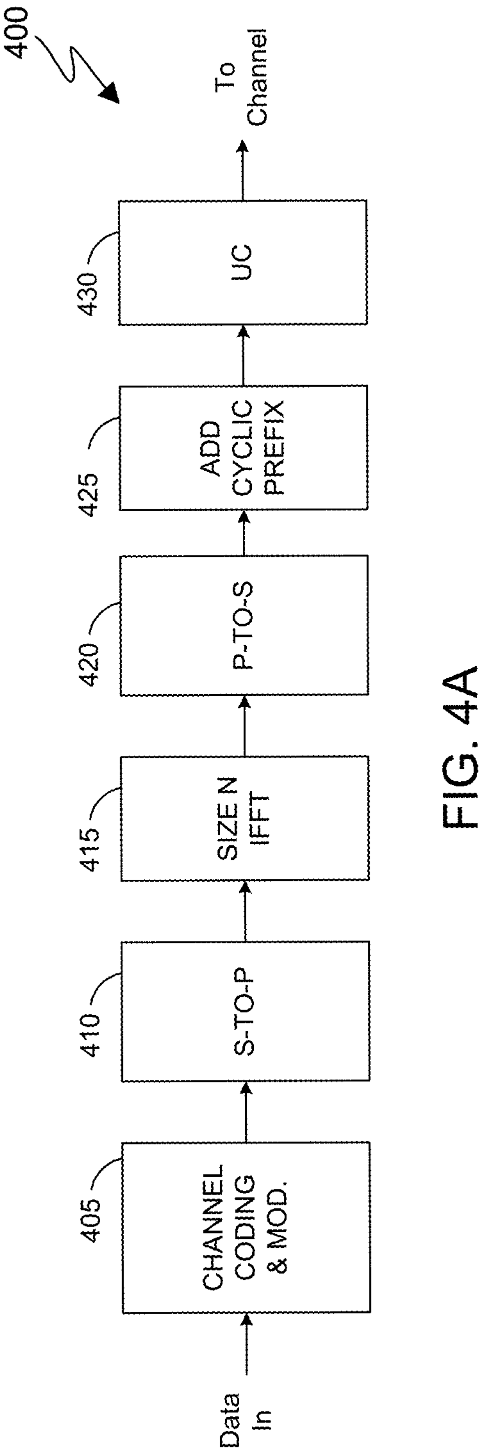
FIGS. 4A-B illustrate example wireless transmit and receive paths according to embodiments of the present disclosure.
Figure 4B:
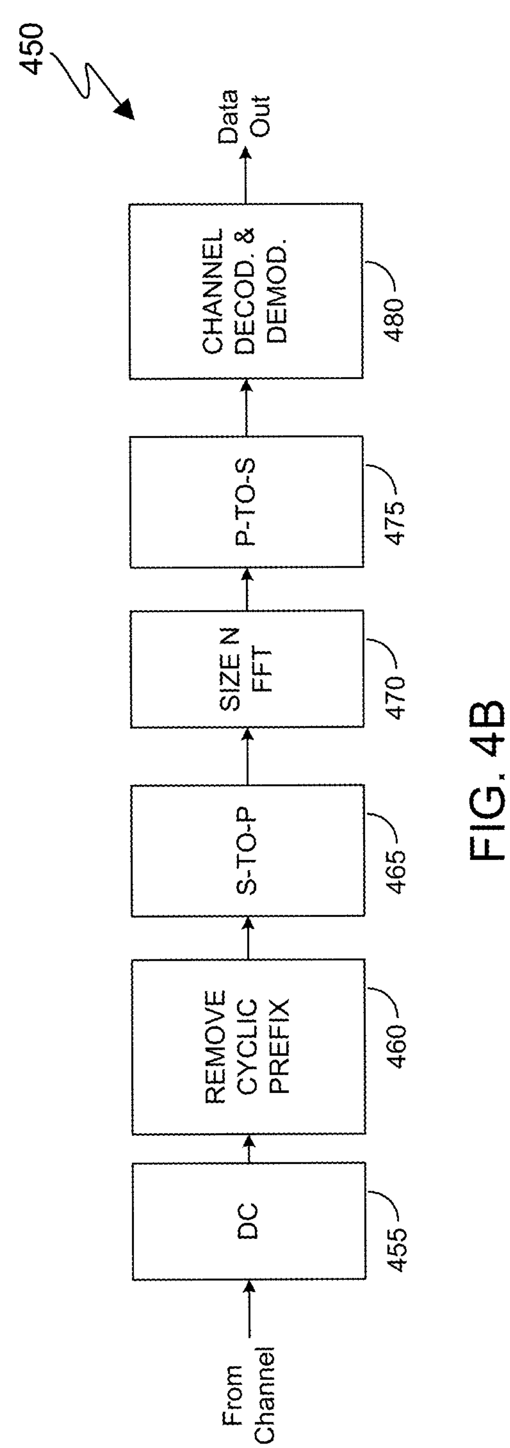

FIGS. 4A and 4B illustrate example wireless transmit and receive paths according to this disclosure. In the following description, a transmit path 400 may be described as being implemented in an gNB (such as gNB 104), while a receive path 450 may be described as being implemented in a UE (such as UE 116). However, it will be understood that the receive path 450 can be implemented in an gNB and that the transmit path 400 can be implemented in a UE.

The transmit path 400 includes a channel coding and modulation block 405, a serial-to-parallel (S-to-P) block 410, a size N Inverse Fast Fourier Transform (IFFT) block 415, a parallel-to-serial (P-to-S) block 440, an add cyclic prefix block 445, and an up-converter (UC) 430. The receive path 450 includes a down-converter (DC) 455, a remove cyclic prefix block 460, a serial-to-parallel (S-to-P) block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 104 and the UE 116. The size N IFFT block 415 performs an IFFT operation on the N parallel symbol streams to generate time-domain output signals. The parallel-to-serial block 440 converts (such as multiplexes) the parallel time-domain output symbols from the size N IFFT block 415 in order to generate a serial time-domain signal. The add cyclic prefix block 445 inserts a cyclic prefix to the time-domain signal. The up-converter 430 modulates (such as up-converts) the output of the add cyclic prefix block 445 to an RF frequency for transmission via a wireless channel. The signal may also be filtered at baseband before conversion to the RF frequency.

A transmitted RF signal from the gNB 104 arrives at the UE 116 after passing through the wireless channel, and reverse operations to those at the gNB 104 are performed at the UE 116. The down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103. In embodiments, the transmit path 400 and the receive path 450 are each configured to support CSI and radio link monitoring with reference signal adaptation.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 4, 3, 4, or the like) for DFT and IDFT functions, while the value of the variable N may be any integer number that is a power of two (such as 1, 4, 4, 8, 16, or the like) for FFT and IFFT functions.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In the following, an italicized name for a parameter implies that the parameter is provided by higher layers.

DL transmissions or UL transmissions can be based on an OFDM waveform including a variant using DFT precoding that is known as DFT-spread-OFDM that is typically applicable to UL transmissions.

In the following, subframe (SF) refers to a transmission time unit for the LTE RAT and slot refers to a transmission time unit for an NR RAT. For example, the slot duration can be a sub-multiple of the SF duration. NR can use a different DL or UL slot structure than an LTE SF structure. Differences can include a structure for transmitting physical downlink control channels (PDCCHs), locations and structure of demodulation reference signals (DM-RS), transmission duration, and so on. Further, eNB refers to a base station serving UEs operating with LTE RAT and gNB refers to a base station serving UEs operating with NR RAT. Exemplary embodiments consider a same numerology, that includes a sub-carrier spacing (SCS) configuration and a cyclic prefix (CP) length for an OFDM symbol, for transmission with LTE RAT and with NR RAT. In such case, OFDM symbols for the LTE RAT as same as for the NR RAT, a subframe is same as a slot and, for brevity, the term slot is subsequently used in the remaining of the disclosure.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration μ as $2^{\mu} \cdot 15$ kHz. A unit of one sub-carrier over one symbol is referred to as resource element (RE). A unit of one RB over one symbol is referred to as physical RB (PRB).

DL signaling include physical downlink shared channels (PDSCHs) conveying information content, PDCCHs conveying DL control information (DCI), and reference signals (RS). A PDCCH can be transmitted over a variable number of slot symbols including one slot symbol and over a number of control channel elements (CCEs) from a predetermined set of numbers of CCEs referred to as CCE aggregation level within a control resource set (CORESET) as described in REF1 and REF3.

Figure 5:
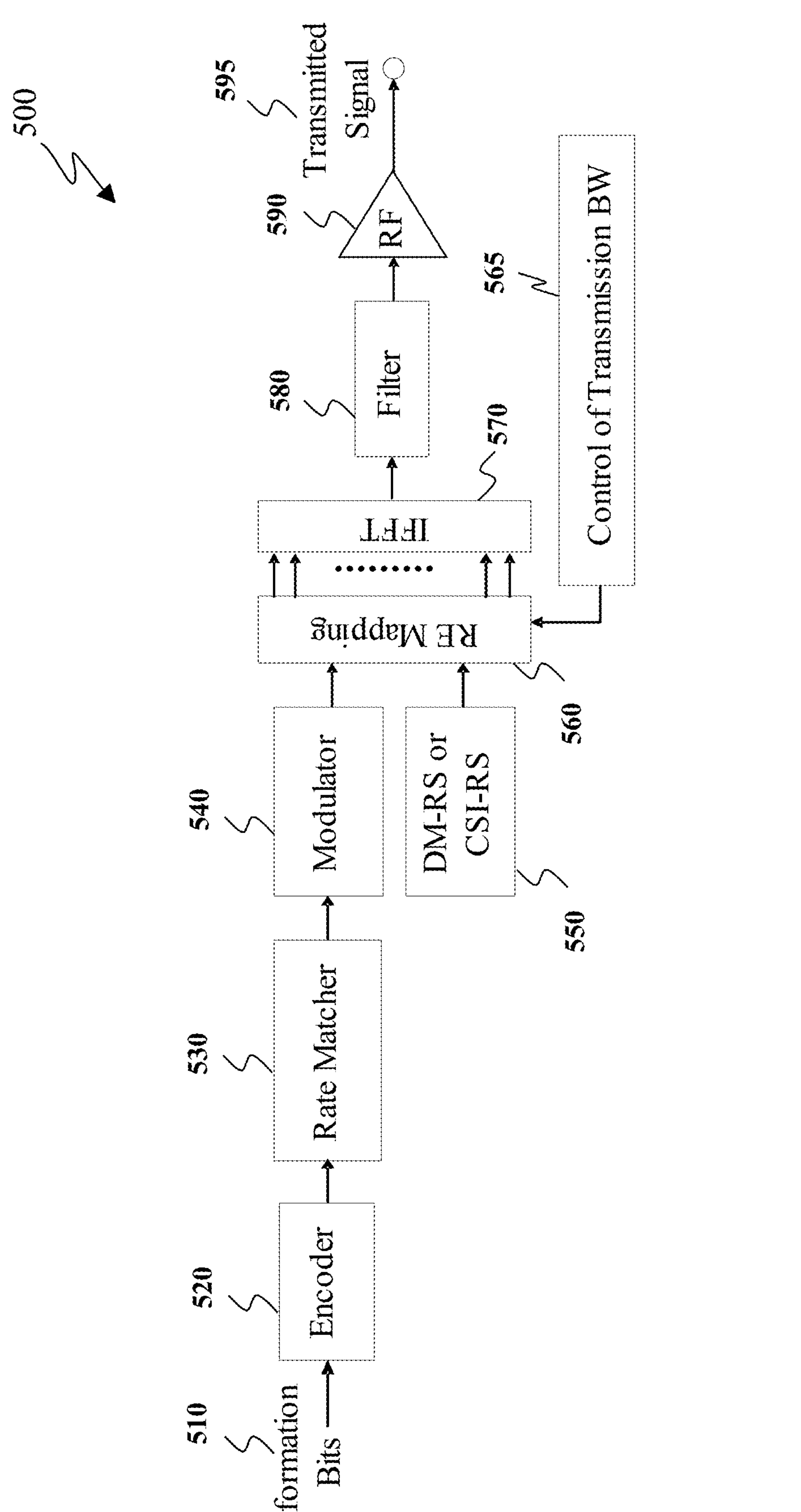
FIG. 5 illustrates a block diagram of an example transmitter structure using OFDM according to embodiments of the present disclosure.

FIG. 5 illustrates a block diagram of an example transmitter structure 500 using OFDM according to this disclosure. The embodiment of the example transmitter structure 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the example transmitter structure 500.

Information bits, such as DCI bits or data bits 510, are encoded by encoder 520, rate matched to assigned time/frequency resources by rate matcher 530, and modulated by modulator 540. Subsequently, modulated encoded symbols and DM-RS or CSI-RS 550 are mapped to REs 560 by RE mapping unit 565, an inverse fast Fourier transform (IFFT) is performed by filter 570, a cyclic prefix (CP) is added by CP insertion unit 580, and a resulting signal is filtered by filter 590 and transmitted by a radio frequency (RF) unit 595. In embodiments, the transmitter structure 500 may be used to facilitate CSI enhancement for network parameter adaptation.

Figure 6:
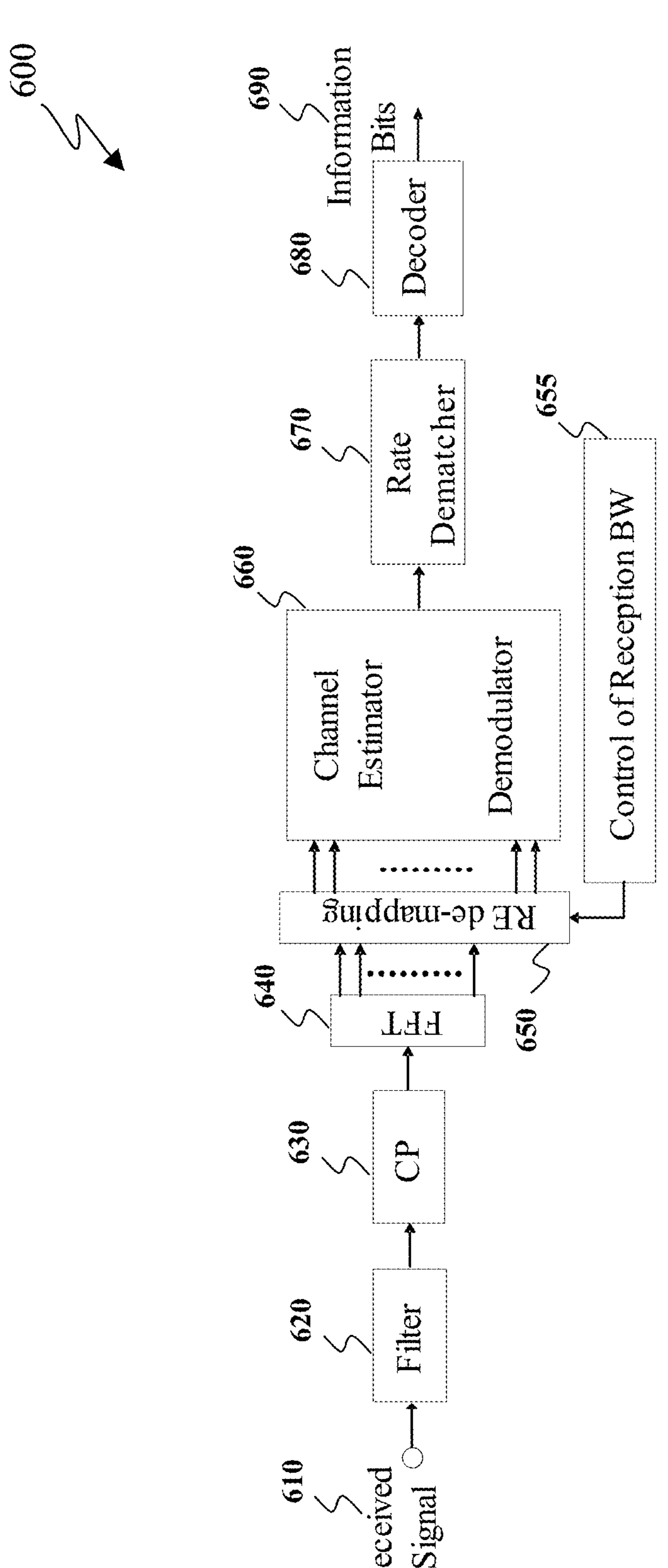
FIG. 6 illustrates a block diagram of an example receiver structure using OFDM according to embodiments of the present disclosure.

FIG. 6 illustrates a block diagram of an example receiver structure 600 using OFDM according to this disclosure. The embodiment of the example receiver structure 600 illustrated in FIG. 6 is for illustration only. FIG. 6 does not limit the scope of this disclosure to any particular implementation of the example receiver structure 600.

A received signal 610 is filtered by filter 620, a CP removal unit removes a CP 630, a filter 640 applies a fast Fourier transform (FFT), RE de-mapping unit 650 de-maps REs selected by BW selector unit 655, received symbols are demodulated by a channel estimator and a demodulator unit 660, a rate de-matcher 670 restores a rate matching, and a decoder 680 decodes the resulting bits to provide information bits 690. In embodiments, the receiver structure 600 may be used to facilitate CSI enhancement for network parameter adaptation.

DCI can serve several purposes. A DCI format includes information elements (IEs) and is typically used for scheduling a PDSCH (DL DCI format) or a PUSCH (UL DCI format) transmission. A DCI format includes cyclic redundancy check (CRC) bits in order for a UE to confirm a correct detection. A DCI format type is identified by a radio network temporary identifier (RNTI) that scrambles the CRC bits. For a DCI format scheduling a PDSCH or a PUSCH for a single UE with RRC connection to a gNB, the RNTI is a cell RNTI (C-RNTI) or another RNTI type such as a MCS-C-RNTI. For a DCI format scheduling a PDSCH conveying system information (SI) to a group of UEs, the RNTI is a SI-RNTI. For a DCI format scheduling a PDSCH providing a response to a random access (RA) from a group of UEs, the RNTI is a RA-RNTI. For a DCI format scheduling a PDSCH providing contention resolution in Msg4 of a RA process, the RNTI is a temporary C-RNTI (TC-RNTI).

For a DCI format scheduling a PDSCH paging a group of UEs, the RNTI is a P-RNTI. For a DCI format providing transmission power control (TPC) commands to a group of UEs, the RNTI is a TPC-RNTI, and so on. Each RNTI type is configured to a UE through higher layer signaling. A UE typically decodes at multiple candidate locations for potential PDCCH transmissions.

Figure 7:
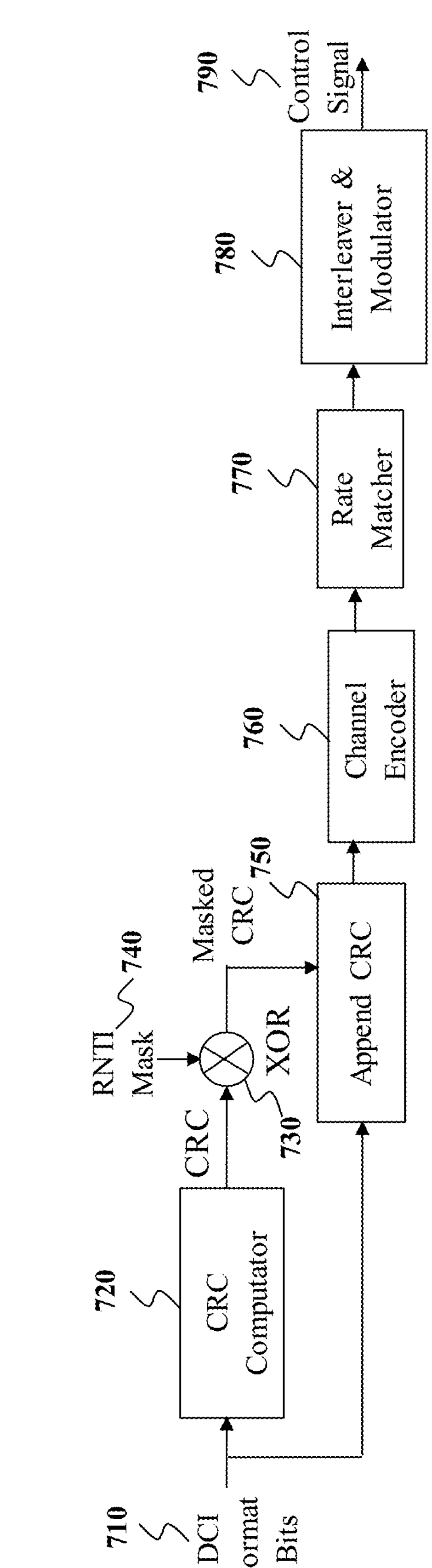
FIG. 7 illustrates a block diagram of an example encoding process for a DCI format according to embodiments of the present disclosure.

FIG. 7 illustrates a block diagram of an example encoding process 700 for a DCI format according to this disclosure. The embodiment of the example encoding process 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the example encoding process 700.

A gNB separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 24 bits and the RNTI can include 16 bits or 24 bits. The CRC of (non-coded) DCI format bits 710 is determined using a CRC computation unit 720, and the CRC is masked using an exclusive OR (XOR) operation unit 730 between CRC bits and RNTI bits 740. The XOR operation is defined as XOR(0,0)=0, XOR(0,1)=1, XOR(1,0)=1, XOR(1,1)=0. The masked CRC bits are appended to DCI format information bits using a CRC append unit 750. An encoder 760 performs channel coding, such as polar coding, followed by rate matching to allocated resources by rate matcher 770. Interleaving and modulation units 780 apply interleaving and modulation, such as QPSK, and the output control signal 790 is transmitted. In embodiments, the encoding process 700 may be used to facilitate CSI enhancement for network parameter adaptation.

Figure 8:
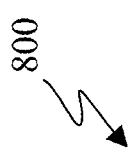
FIG. 8 illustrates a block diagram of an example decoding process for a DCI format for use with a UE according to embodiments of the present disclosure.
Figure 8:
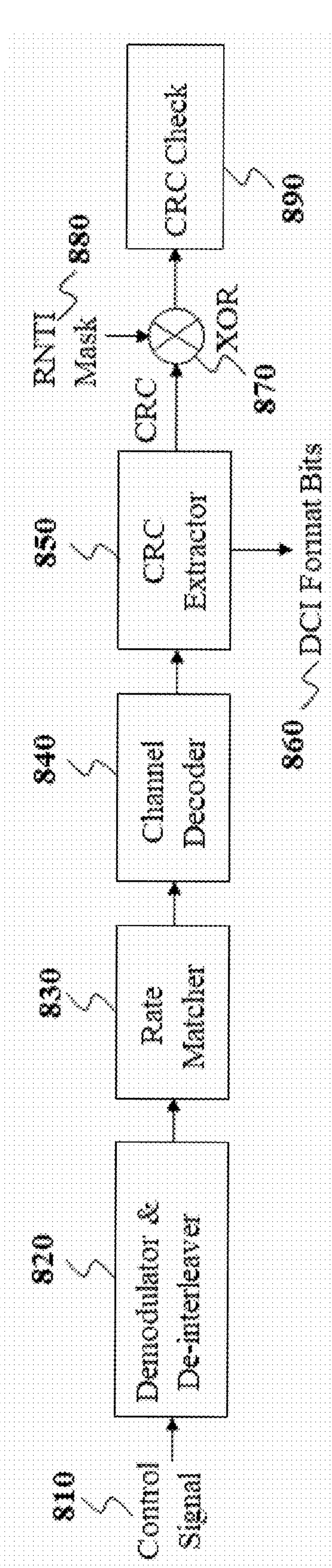

FIG. 8 illustrates a block diagram of an example decoding process 800 for a DCI format for use with a UE according to this disclosure. The embodiment of the example decoding process 800 illustrated in FIG. 8 is for illustration only. FIG. 8 does not limit the scope of this disclosure to any particular implementation of the example decoding process 800.

A received control signal 810 is demodulated and de-interleaved by a demodulator and a de-interleaver 820. A rate matching applied at a gNB transmitter is restored by rate matcher 830, and resulting bits are decoded by decoder 840. After decoding, a CRC extractor 850 extracts CRC bits and provides DCI format information bits 860. The DCI format information bits are de-masked 870 by an XOR operation with a RNTI 880 (when applicable) and a CRC check is performed by unit 890. When the CRC check succeeds (check-sum is zero), the DCI format information bits are considered to be valid. When the CRC check does not succeed, the DCI format information bits are considered to be invalid. In embodiments, the decoding process 800 may be used to facilitate CSI enhancement for network parameter adaptation.

For each DL bandwidth part (BWP) indicated to a UE in a serving cell, the UE can be provided by higher layer signaling with P≤3 control resource sets (CORESETs). For each CORESET, the UE is provided a CORESET index p, 0≤p<12, a DM-RS scrambling sequence initialization value, a precoder granularity for a number of resource element groups (REGs) in the frequency domain where the UE can assume use of a same DM-RS precoder, a number of consecutive symbols for the CORESET, a set of resource blocks (RBs) for the CORESET, CCE-to-REG mapping parameters, an antenna port quasi co-location, from a set of antenna port quasi co-locations, indicating quasi co-location information of the DM-RS antenna port for PDCCH reception in a respective CORESET, and an indication for a presence or absence of a transmission configuration indication (TCI) field for DCI format 1_1 transmitted by a PDCCH in CORESET p.

For each DL BWP configured to a UE in a serving cell, the UE is provided by higher layers with S≤10 search space sets. For each search space set from the S search space sets, the UE is provided a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s<k_s$ slots indicating a number of slots that the search space set s exists, a number of PDCCH candidates $$M_s^{(L)}$$

per CCE aggregation level L, and an indication that search space set s is either a CSS set or a USS set. When search space set s is a CSS set, the UE monitors PDCCH for detection of DCI format 2_x, where x ranges from 0 to 7 as described in REF2, or for DCI formats associated with scheduling broadcast/multicast PDSCH receptions, and possibly for DCI format 0_0 and DCI format 1_0.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $$n_{s,f}^{\mu}$$

in a frame with number $n_f$ if $$N_{slot}^{frame,\mu}+n_{s,f}^{\mu}$$

mod $k_s$=0. The UE monitors PDCCH candidates for search space set s for $T_s$ consecutive slots, starting from slot $$n_{s,f}^{\mu}$$

and does not monitor PDCCH candidates for search space set s for the next $k_s-T_s$ consecutive slots. The UE determines CCEs for monitoring PDCCH according to a search space set based on a search space equation as described in REF3.

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving/scheduled cell based on a number of PDCCH candidates in respective search space sets for the corresponding active DL BWP. In the following, for brevity, that constraint for the number of DCI format sizes will be referred to as DCI size limit. When the DCI size limit would be exceeded for a UE based on a configuration of DCI formats that the UE monitors PDCCH, the UE aligns the size of some DCI formats, as described in REF2, so that the DCI size limit would not be exceeded.

For each scheduled cell, the UE is not required to monitor on the active DL BWP with SCS configuration u of the scheduling cell more than $$M_{PDCCH}^{max,slot,\mu},\ M_{PDCCH}^{total,slot,\mu}$$

PDCCH candidates or more than $$C_{PDCCH}^{max,slot,\mu},\ C_{PDCCH}^{total,slot,\mu}$$

non-overlapped CCEs per slot, wherein $$M_{PDCCH}^{max,slot,\mu}$$

and $$C_{PDCCH}^{max,slot,\mu}$$

are respectively a maximum number of PDCCH candidates and non-overlapping CCEs for a scheduled cell and $$M_{PDCCH}^{total,slot,\mu}$$

and $$C_{PDCCH}^{total,slot,\mu}$$

are respectively a total number of PDCCH candidates and non-overlapping CCEs for a scheduling cell, as described in REF3.

A UE does not expect to be configured CSS sets, other than CSS sets for multicast PDSCH scheduling, that result to corresponding total, or per scheduled cell, numbers of monitored PDCCH candidates and non-overlapped CCEs per slot on the primary cell that exceed the corresponding maximum numbers per slot. For USS sets or for CSS sets associated with multicast PDSCH scheduling, when a number of PDCCH candidates or non-overlapping CCEs in a slot would exceed the aforementioned limits/maximum per slot for scheduling on the primary cell, the UE selects the USS sets or the CSS sets to monitor corresponding PDCCH in an ascending order of a corresponding search space set index until and an index of a search space set for which PDCCH monitoring would result to exceeding the maximum number of PDCCH candidates or non-overlapping CCEs per slot for scheduling on the PCell as described in REF3.

For same cell scheduling or for cross-carrier scheduling where a scheduling cell and scheduled cells have DL BWPs with same SCS configuration u, a UE does not expect a number of PDCCH candidates, and a number of corresponding non-overlapped CCEs per slot on a secondary cell to be larger than the corresponding numbers that the UE is capable of monitoring on the secondary cell per slot. For cross-carrier scheduling, the number of PDCCH candidates for monitoring and the number of non-overlapped CCEs per slot are separately counted for each scheduled cell.

A UE can be configured for operation with carrier aggregation (CA) for PDSCH receptions over multiple cells (DL CA) or for PUSCH transmissions over multiple cells (UL CA). The UE can also be configured multiple transmission-reception points (TRPs) per cell via indication (or absence of indication) of a coresetPoolIndex for CORESETs where the UE receives PDCCH/PDSCH from a corresponding TRP as described in REF3 and REF4.

The MIMO technologies have been playing a key role in boosting system throughput both in NR and LTE and such a role will be continued and further expanded in the future generation wireless technologies.

An antenna port is defined such that the channel over which a symbol on the antenna port is conveyed can be inferred from the channel over which another symbol on the same antenna port is conveyed. There is not necessarily one to one correspondence between an antenna port and an antenna element, and a plurality of antenna elements can be mapped onto one antenna port.

For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital-converters (ADCs)/digital-to-analog converters (DACs) at mmWave frequencies) as illustrated in FIG. 8. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols, slots or subframes. The number of sub-arrays (equal to the number of RF chains) is the same as the number of CSI-RS ports $N_{CSI\text{-}PORT}$. A digital beamforming unit performs a linear combination across $N_{CSI\text{-}PORT}$ analog beams to further increase precoding gain. While analog beams are wideband (hence not frequency-selective), digital precoding can be varied across frequency sub-bands or resource blocks.

Figure 9:
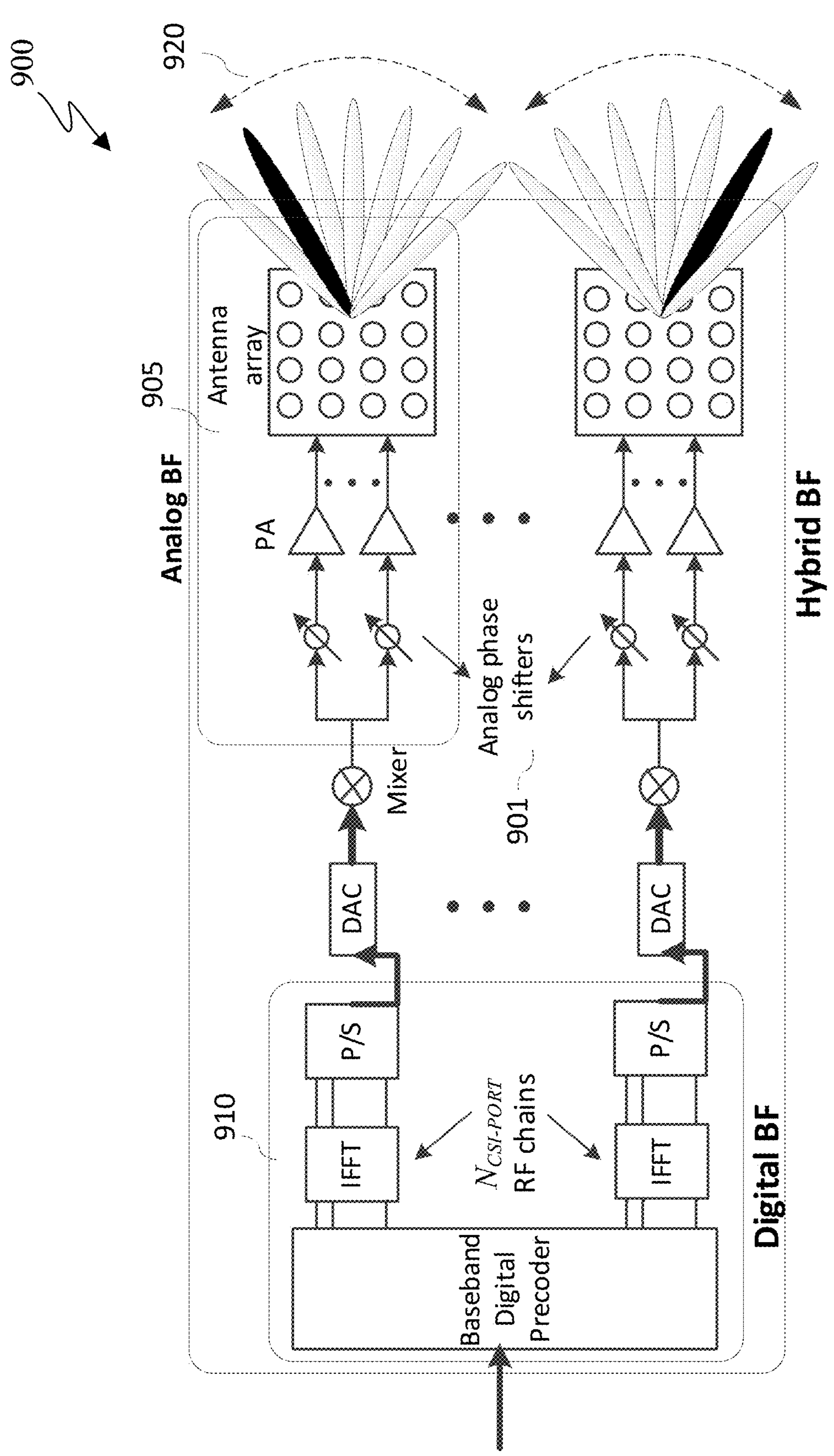
FIG. 9 illustrates an example antenna blocks or arrays forming beams according to embodiments of the present disclosure.

FIG. 9 illustrates an example antenna blocks or arrays 900 forming beams according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

Rel-15 NR specifications support up to 32 CSI-RS antenna ports which enable a gNB to be equipped with a large number of antenna elements (such as 64 or 128). In this case, a plurality of antenna elements is mapped onto one CSI-RS port. For FR2, e.g., mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901.

One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as FR2-2, e.g., >52.6 GHz. In this case, the system can employ only analog beams. Due to the O2 absorption loss around 60 GHz frequency (~10 dB additional loss @100m distance), larger number of and sharper analog beams (hence larger number of radiators in the array) will be needed to compensate for the additional path loss. The antenna blocks or arrays 900 may be used to facilitate CSI enhancement for network parameter adaptation discussed in further detail below. In embodiments of this disclosure, the example antenna blocks or arrays 900 forming beams may facilitate CSI enhancement for network parameter adaptation.

To enable digital precoding, efficient design of CSI-RS is a crucial factor. For this reason, three types of CSI reporting mechanism corresponding to three types of CSI-RS measurement behavior are supported in Rel.13 LTE: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell-wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell-wide coverage, and (at least from the eNB perspective) at least some CSI-RS port-resource combinations have different beam directions. The basic principle remains the same in NR.

In scenarios where DL long-term channel statistics can be measured through UL signals at a serving gNB, UE-specific beamformed CSI-RS can be readily used. This is typically feasible when UL-DL duplex distance is sufficiently small. When this condition does not hold, however, some UE feedback is necessary for the gNB to obtain an estimate of DL long-term channel statistics (or any of its representation thereof). To facilitate such a procedure, a first beamformed CSI-RS transmitted with periodicity T1 (*ms*) and a second NP CSI-RS transmitted with periodicity T2 (*ms*), where T1≤T2. This approach is termed hybrid CSI-RS. The implementation of hybrid CSI-RS is largely dependent on the definition of CSI process and NZP CSI-RS resource.

One of the key components of a MIMO transmission scheme is the accurate CSI acquisition at the gNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from gNB, and CSI acquisition and feedback from UE. In LTE up to Rel. 13, for FDD systems, the CSI feedback framework is 'implicit' in the form of CQI/PMI/RI (and CRI in Rel. 13) derived from a codebook assuming SU transmission from eNB. Because of the inherent SU assumption while deriving CSI, this implicit CSI feedback is inadequate for MU transmission. On the other hand, NR system has been designed to be more MU-centric from its first release with high resolution Type-II codebook in addition to low resolution Type-I codebook.

Among various higher layer signaling from serving gNB to UE (as described further in REF6), a set of IEs related to this disclosure are described in the following.

To configure codebooks of Type-I and Type-II to a UE by the serving gNB using a higher layer signaling, the IE CodebookConfig is used: codebookType includes type 1, type2 and possibly sub-types such as typeI-SinglePanel, typeI-MultiPanel, typeII, and typeII-PortSelection, and corresponding parameters for each type; n1-n2 is used to configure the number of antenna ports in first (n1) and second (n2) dimension and codebook subset restriction for typeI-SinglePanel; ng-n1-n2 is used to configure the number of antenna panels (ng), the number of antenna ports in first (n1) and second (n2) dimension assuming that the antenna structure is identical for the configured number of panels, and codebook subset restriction for Type I Multi-panel codebook; n1-n2-codebookSubsetRestriction is used to configure the number of antenna ports in first (n1) and second (n2) dimension and codebook subset restriction for typeII; CodebookConfig-r17 includes typeI-SinglePanel1-r17 and type1-SinglePanel2-r17 for type 1, to allow configuring different antenna structures for two TRPs.

To indicate the resource element mapping of a CSI-RS resource in time- and frequency domain, the IE CSI-RS-ResourceMapping is used. The container includes elements for time- and frequency domain resource configuration such as firstOFDMSymbolInTime Domain, firstOFDMSymbolInTimeDomain2, and frequencyDomainAllocation, the CSI-RS density, density, the number of ports, nrofPorts, among others. The IE CSI-RS-ResourceMapping comprises the NZP-CSI-RS-Resource and ZP-CSI-RS-Resource configurations, which are included in the CSI-ResourceConfig. The IE CSI-ResourceConfig defines a group of one or more NZP-CSI-RS-ResourceSet, CSI-IM-ResourceSet and/or CSI-SSB-ResourceSet.

The IE CSI-ReportConfig is used to indicate to a UE parameters for providing a periodic or semi-persistent CSI report via PUCCH transmissions on the cell where CSI-ReportConfig is included, or to indicate parameters for providing a semi-persistent or aperiodic CSI report on a PUSCH as triggered by a DCI that the UE receives. The CSI-ReportConfig is set for certain CSI-ResourceConfigId for channel/interference measurements. The aforementioned CodebookConfig is also part of CSI-ReportConfig.

For aperiodic CSI, both aperiodic CSI reporting and aperiodic CSI-RS transmission are triggered using a 'CSI Request' field within a DCI format scheduling a PUSCH transmission, such as DCI format 0_1. The 'CSI Request' field indicates a 'Trigger State' that points to a certain CSI-ReportConfigId and resourcesForChannel, e.g., NZP-CSI-RS-ResourceSet. The 'CSI Request' field can have up to 6 bits and can indicate up to 64 'Trigger States'. If a UE is configured with more than 64 'Trigger States', a 'Aperiodic CSI Trigger State Subselection' MAC CE identifies a subset of Trigger States that are indicated by DCI.

For semi-persistent CSI on PUCCH, the semi-persistent CSI-RS resource is triggered by a "SP CSI-RS/CSI-IM Resource Set Activation/Deactivation" MAC CE that includes a SP CSI-RS resource set ID indicating an index of NZP-CSI-RS-ResourceSet containing Semi Persistent NZP CSI-RS resources indicating the Semi Persistent NZP CSI-RS resource set, that is to be activated or deactivated. Semi-persistent CSI reporting on PUCCH is triggered using the "SP CSI reporting on PUCCH Activation/Deactivation" MAC CE. The field $S_i$ in the MAC CE indicates the activation/deactivation status of the Semi-Persistent CSI report configuration within csi-ReportConfigToAddMod-List. $S_0$ refers to the report configuration that includes PUCCH resources for semi-persistent CSI reporting in the indicated BWP and has the lowest CSI-ReportConfigId within the list with type set to semiPersistentOnPUCCH, $S_1$ refers to the report configuration that includes PUCCH resources for semi-persistent CSI reporting in the indicated BWP and has the second lowest CSI-ReportConfigId, and so on.

For semi-persistent CSI reporting on PUSCH, a CSI report is triggered using a 'CSI Request' field in a DCI format 0_1 with CRC scrambled by a SP-CSI-RNTI. The operating details are similar to those for an aperiodic CSI report.

For periodic CSI reporting, both reporting and periodic CSI-RS resources are configured and initiated by CSI-ReportConfig.

Present networks have limited capability to adapt an operation state in one or more of time/frequency/spatial/power domains. For example, in NR, there are transmissions or receptions by a serving gNB that are expected by UEs, such as transmissions of SS/PBCH blocks, or of system information, or of CSI-RS indicated by higher layers, or receptions of PRACH or SRS indicated by higher layers. Reconfiguration of a NW operation state involves higher layer signaling by a SIB or by UE-specific RRC. That is a slow process and requires substantial signaling overhead, particularly for UE-specific RRC signaling. For example, it is currently not practical or possible for a network in typical deployments to enter an energy saving state where the network does not transmit or receive due to low traffic as, in order to obtain material energy savings, the network needs to suspend transmissions or receptions for several tens of milliseconds and preferably for even longer time periods. A similar inability exists for suspending transmission or receptions for shorter time periods as a serving gNB may need to frequently transmit SS/PBCH blocks, such as every 5 msec or every 20 msec and, in TDD systems with UL-DL configurations having few UL symbols in a period, the serving gNB may need to receive PRACH or SRS in most UL symbols in a period.

Due to the above reasons, adaptation of a NW operation state is typically over long time periods, such as for off-peak hours when an amount of served traffic is small and for peak hours when an amount of served traffic is large. Therefore, a capability of a gNB to improve service by fast adaptation of a NW operation state to the traffic types and load, or to save energy by switching to a state that requires less energy consumption when an impact on service quality would be limited or none, is currently limited as there are no procedures for a serving gNB to perform fast adaptation of a NW operation state with small signaling overhead while simultaneously informing all UEs of the NW operation state.

It is also beneficial to support a gradual transition of NW operation states between a maximum state where the NW operates at its maximum capability in one or more of a time/frequency/spatial/power domain and a minimum state where the NW operates at its minimum capability, or the NW enters a sleep mode. That would allow continuation of service while the NW transitions from a state with larger utilization of time/frequency/spatial/power resources to a state with lower utilization of such resources and the reverse as UEs can obtain time/frequency synchronization and automatic gain controller (AGC) alignments, perform measurements and provide CSI reports or transmit SRS prior to scheduling of PDSCH receptions or PUSCH transmissions.

In order to enable a gNB to sleep and save energy while minimizing an impact on served UEs, the gNB can apply cell DTX or cell DRX on a serving cell. UEs in the cell can be informed of corresponding cell DTX/DRX configurations such that the UEs can operate accordingly and avoid power consumption when the serving gNB is in dormancy (cell DTX/DRX). By turning off all or a part of a transmission chain and pausing transmission during the cell DTX, the gNB can reduce energy consumption for standby when there is little to no traffic. For cell DTX, a UE may assume that all transmissions from a serving gNB are suspended or the UEs may assume that some signals, such as PSS or SSS for maintaining synchronization, remain present during cell DTX. By turning off all or a part of receiver chain and pausing receptions during the cell DRX, the gNB can reduce energy consumption for standby when there is little to no traffic. For cell DRX, a UE may assume that all transmissions from the UE are suspended or may assume that some transmissions, such as ones required for initial access such as PRACH, are allowed during a cell DRX duration.

Figure 10:
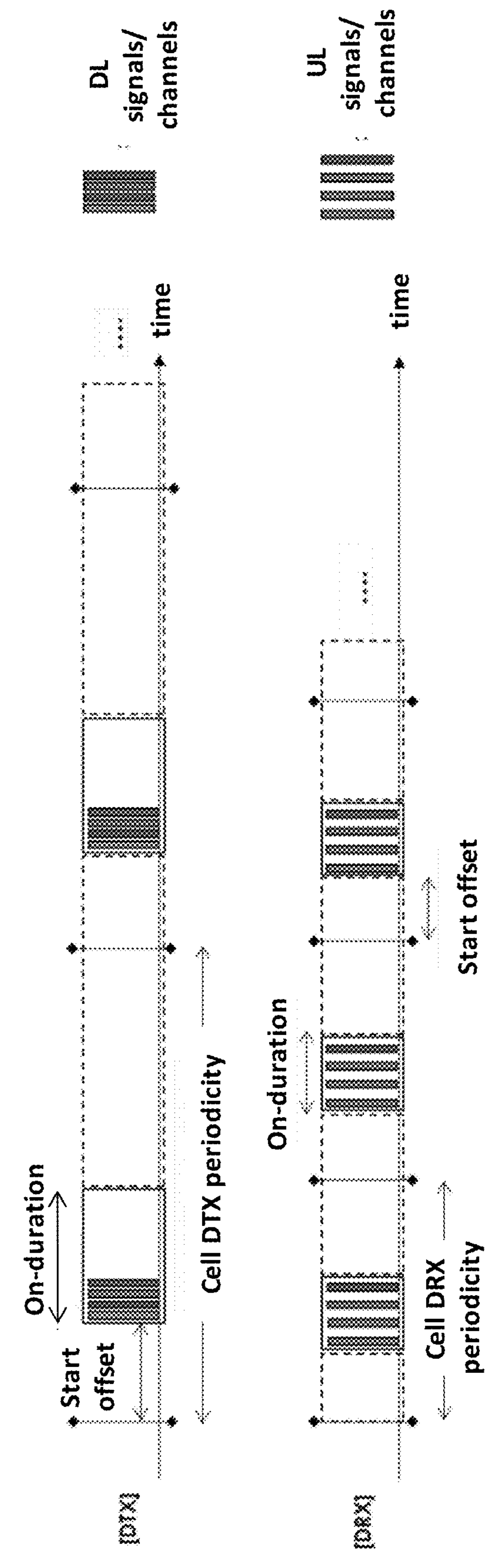
FIG. 10 illustrates a block diagram of discontinuous transmission (DTX) and cell discontinuous reception (DRX) according to embodiments of the present disclosure according to embodiments of the present disclosure.

FIG. 10 illustrates a block diagram 1000 of cell DTX/DRX according to embodiments of the present disclosure. The embodiment of the diagram 1000 illustrated in FIG. 10 is for illustration only. FIG. 10 does not limit the scope of this disclosure to any particular implementation.

As illustrated in FIG. 10, cell DTX/DRX can be configured via at least a periodicity, a start slot/offset, and an on-duration. A UE assumes that all transmissions/receptions by the gNB are enabled during the DTX/DRX on-duration, respectively. The configurations and operations of cell DTX and cell DRX can be linked or can be separate, for example depending on DL/UL traffic characteristics.

The energy consumption by power amplifiers (PA) for each set of antenna elements (AEs) accounts for a large portion of total energy consumption by a gNB equipped with massive MIMO antennas. For network energy savings, when the traffic load is low, the gNB can turn off a subset of PAs or reduce the PA output power levels. For brevity, such operation is respectively referred to as spatial domain (SD) or power domain (PD) adaptation in this embodiment of the disclosure. Unlike cell DTX/DRX illustrated in FIG. 9, one advantage of SD/PD adaptation is that the network can maintain continuity of transmissions and receptions without interruptions by operating at a reduced capability.

Figure 11:
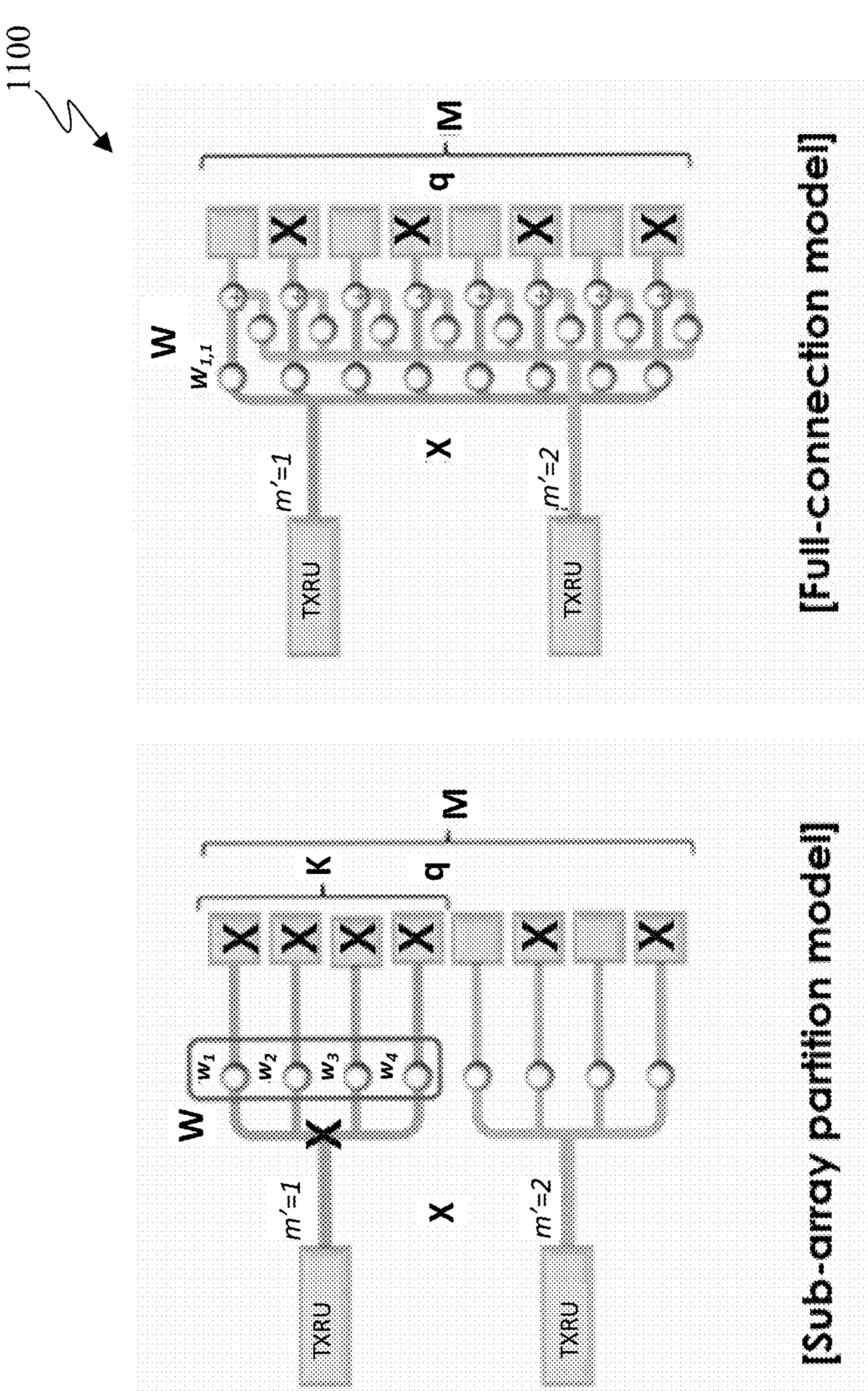
FIG. 11 illustrates a diagram of spatial element adaptation in a sub-array partition model and full-connection model according to embodiments of the present disclosure.

FIG. 11 illustrates a diagram 1100 of spatial element adaptation in a sub-array partition model and full-connection model. The embodiment of the diagram 1100 illustrated in FIG. 11 is for illustration only. FIG. 11 does not limit the scope of this disclosure to any particular implementation of the diagram 1100.

A gNB can enable/disable all AEs associated to a logical antenna port or enable/disable a subset of AEs associated to a logical antenna port. For brevity, those adaptations of AEs are respectively referred to as Type 1 and Type 2 SD adaptations in this embodiment of the disclosure. The gNB may perform Type 1 SD adaptation, or Type 2 SD adaptation, or both.

In a hybrid beamforming system as illustrated in FIG. 9, one antenna port is connected to a large number of AEs that can be controlled by a bank of analog phase shifters, which is referred to as TxRU virtualization. The TxRU virtualization can be implemented based on sub-array partition model, full-connection model, or combinations of them, as illustrated in FIG. 11. In a sub-array partition model, spatial element adaptations can result in both Type 1 and Type 2 SD adaptations. In case of Type 1 SD adaptation, both the PAs connected to AEs associated to a logical antenna port and the subsequent RF chain, e.g., ADC/DAC, etc., associated to the logical antenna port can be turned off. In a full-connection model, spatial element adaptations can only result in Type 2 SD adaptations unless all the antenna ports are turned off.

The impact of Type 1 SD adaptation results in a change in the number of active antenna ports or antenna structure in general. The RF characteristics, e.g., radiation power, beam pattern, etc., of remaining antenna ports remain same. The impact of Type 2 SD adaptation results in a change in the RF characteristics of antenna ports affected by AE on/off while the number of antenna ports remains the same. The impact of PD adaptation is similar to Type 2 SD adaptation. A gNB can perform any combination of Type 1 SD, Type 2 SD, and PD adaptations together with other time/frequency domain adaptation techniques such as cell DTX/DRX.

For SD/PD adaptation, a CSI-RS transmission power can change. A UE needs to be informed of such change in order for the UE to accurately determine a CSI report, such as a CQI mapping to an MCS such that the UE can receive a TB in a PDSCH with a target BLER, such as 10%. Therefore, there is a need for indicating, by a gNB to UEs, a CSI-RS transmission power change to enable correct calculation by a UE of a CSI report, such as for a CQI, or of L1-RSRP.

A UE may experience beam failure and/or radio link failure when a serving gNB reduces a transmission power. Further, the UE may be unable to complete a beam switching or a handover procedure. Therefore, there is a need for identifying an impact of a candidate power reduction on beam/cell coverage to avoid a CSI-RS and/or PDSCH power adjustment that may result in beam and/or radio link failure.

Figure 12:
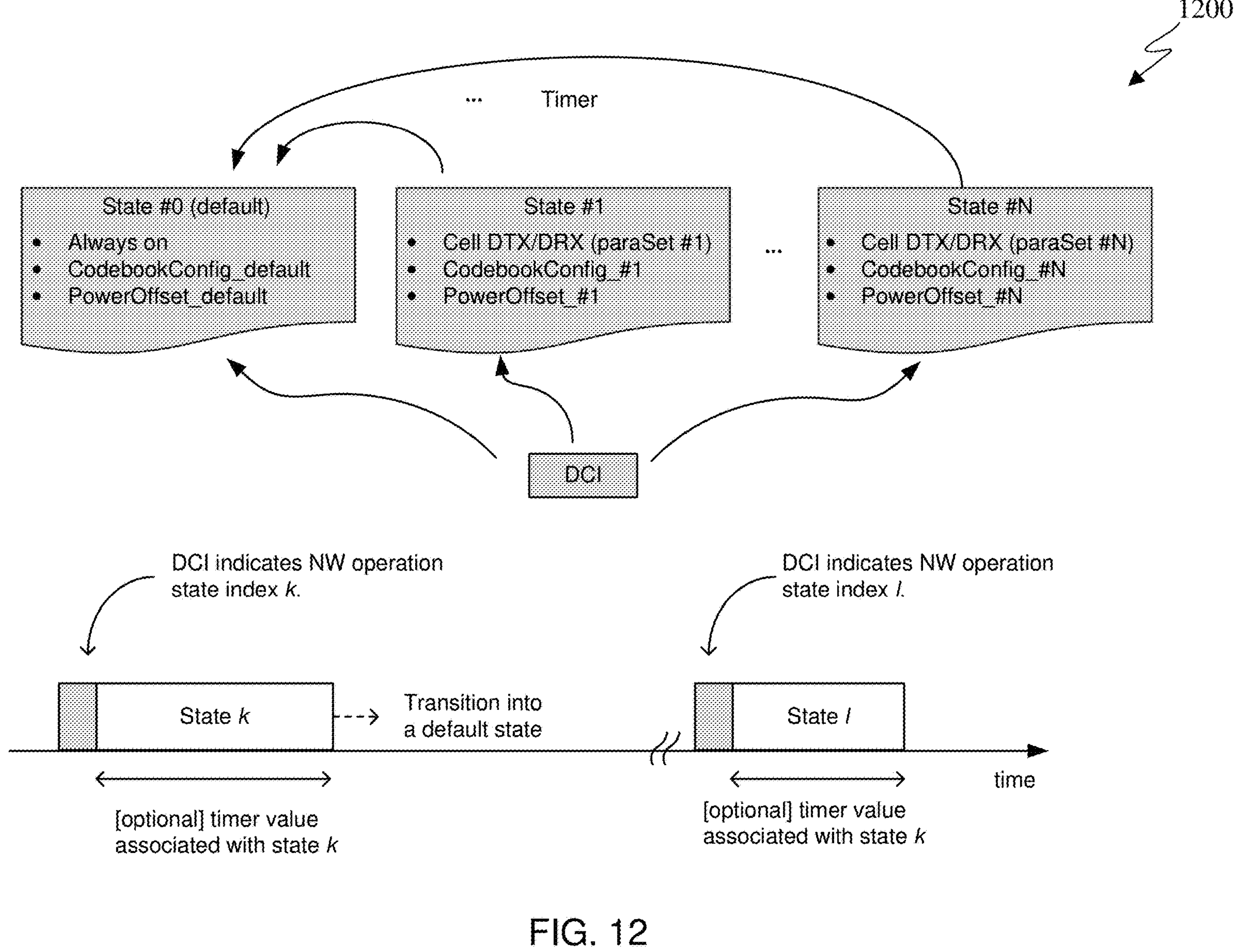
FIG. 12 illustrates a block diagram of an example method for configuring one or multiple network operation states using high-layer signaling and triggering network state transition using downlink control information (DCI) indicating network operation state index according to embodiments of the present disclosure.

FIG. 12 illustrates a block diagram of an example method 1200 for configuring one or multiple network operation states using high-layer signaling and triggering network state transition using DCI indicating network operation state index. The embodiment of the method 1200 illustrated in FIG. 12 is for illustration only. FIG. 12 does not limit the scope of this disclosure to any particular implementation of the method 1200.

A network operation state is defined as a set of network operation parameters, such that cell DTX/DRX, spatial domain adaptation, and power domain adaptation can be jointly configured. Multiple network operation states can be configured via higher-layer signaling and the state index can be indicated in the DCI.

A UE can be configured with a network operation state, incorporating the adaptation from cell DTX/DRX, spatial domain solution, and power domain solution, as well as other energy saving enhancements in the future. The followings are examples of possible network operation state configuration: Example 1: A network operation state can be associated with an active/non-active period of cell DTX/DRX, applied power offset, and/or active spatial element; Example 2: A network operation state can be associated with a set of configurations for cell DTX/DRX, within multiple sets of configuration; Example 3: A network operation state can be associated with either activation or deactivation of cell DTX/DRX.

In method 1200, a UE is provided from a serving cell via higher layer signaling, e.g., RRC, one or multiple network operation states and receives DCI triggering state transition. For example, there can be 3 DTX states (together with the 'ON' state), each corresponding to a value for {on-duration, offset, may be Inactivity Timer}—DCI has 2 bits to indicate 1 of the 3 DTX states (or the 'ON' state). In another example, there can be only one DTX configuration and 1 bit in the DCI can indicate either activation or deactivation of the DTX configuration.

Search space set group indication may also be provided (e.g., UE may switch to more/less frequent PDCCH monitoring).

In addition to indicating the network operation state index, the triggering DCI can be further augmented as below.

The DCI includes timer values for indicating valid duration of currently indicated network operation state. There can be a default network operation state defined and the UE switches to the default network operation state upon expiration of the timer.

The DCI can indicate a series of M network state indices to UE using a single DCI. The UE will go through a sequence of M network state transitions. There may be a default valid duration timer applied to all the network operation states, a separate valid duration timer is configured for each state using higher layer signaling, or a set of valid duration timer values are indicated along with the M indicated network operation states using DCI. The DCI indicated validity duration timer may be an index from a set of candidate values configured via higher-layer signaling.

The DCI may indicate network states for N cell groups/TRPs to the UE using a single DCI.

The DCI can indicate an index of network state and the next PDCCH monitoring occasion for state transition.

Figure 13:
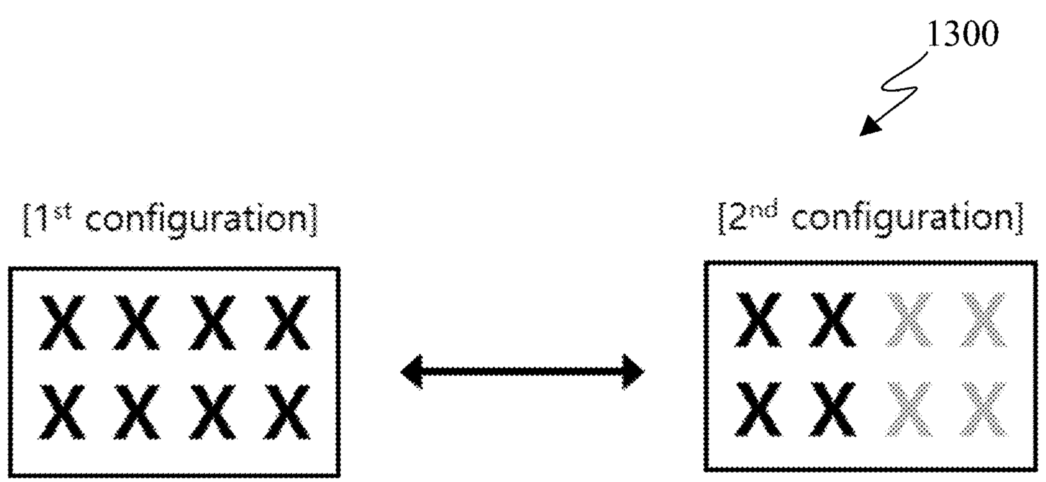
FIG. 13 illustrates a diagram of antenna port adaptations according to embodiments of the present disclosure.

FIG. 13 illustrates a diagram of antenna port adaptations 1300. The embodiment of the diagram of antenna port adaptations 1300 illustrated in FIG. 13 is for illustration only. FIG. 13 does not limit the scope of this disclosure to any particular implementation of, or adaptations illustrated in, the diagram of antenna port adaptations 1300.

In another method of network energy saving, the number of active antenna ports for DL transmission and reception at gNB can be adapted, as shown by example in FIG. 13. As the number of active antenna ports changes, the CSI report from the UE needs to be adjusted accordingly. In one example, a UE can be provided by the serving cell multiple hypotheses on the possible antenna structures for adaptation in the CodebookConfig. In the example figure, for Type-I SP case, two-four-TypeI-SinglePanel-Restriction is configured for the 1$^{st}$ configuration and two-two-TypeI-SinglePanel-Restriction is configured for the 2$^{nd}$ configuration.

For CSI report, a UE calculates multiple CSI assuming RRC configured antenna structures and send in one CSI report. CSI report can be enhanced to reduce the payload size. Alternatively, a UE can be indicated by a DCI, e.g., DCI triggering aperiodic CSI, one or multiple indices of antenna structures from a set of RRC configured structures to derive CSI.

Figure 14:
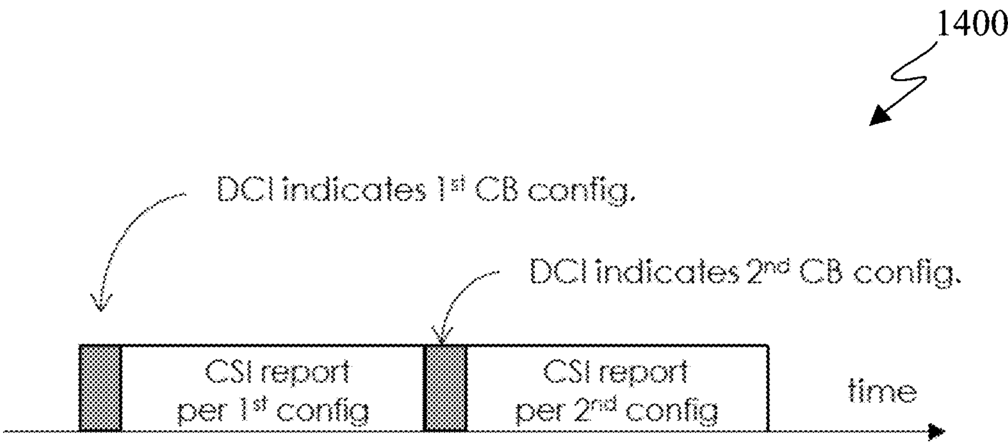
FIG. 14 illustrates a diagram for triggering antenna port adaptation in codebook configuration for CSI reporting using DCI according to embodiments of the present disclosure.

FIG. 14 illustrates a diagram 1400 for triggering antenna port adaptation using DCI. The embodiment of the diagram 1400 illustrated in FIG. 14 is for illustration only. FIG. 14 does not limit the scope of this disclosure to any particular implementation of diagram 1400.

The spatial domain adaptation, including antenna ports, panels, TRPs, and/or transceiver chain, can be combined with adaptations for other domains in a unified manner by defining a network operation states described by set of network operation parameters.

TABLE 1 below illustrates an exemplary process for enhancement of RRC messages to support antenna port adaptations. Table 1 is for illustration only and is not intended to limit the scope of this disclosure to the particular implementation of the process presented in Table 1.

```
typeI-SinglePanel                                SEQUENCE {
                    nrOfAntennaPorts
CHOICE {
                      two
SEQUENCE {
                        twoTX-CodebookSubsetRestriction
BIT STRING (SIZE ( 6 ) )
                      } ,
                      moreThanTwo
SEQUENCE {
                        n1-n2
CHOICE {
                            two-one-TypeI-SinglePanel-Restriction
BIT STRING ( SIZE ( 8 ) ) ,
                            two-two-TypeI-SinglePanel-Restriction
BIT STRING ( SIZE ( 64 ) ) ,
                            four-one-TypeI-SinglePanel-Restriction
BIT STRING ( SIZE ( 16 ) ) ,
                            three-two-TypeI-SinglePanel-Restriction
BIT STRING ( SIZE ( 96 ) ) ,
                            six-one-TypeI-SinglePanel-Restriction
BIT STRING ( SIZE ( 24 ) ) ,
                            four-two-TypeI-SinglePanel-Restriction
BIT STRING ( SIZE ( 128 ) ) ,
                            eight-one-TypeI-SinglePanel-Restriction
BIT STRING ( SIZE ( 32 ) ) ,
                            four-three-TypeI-SinglePanel-Restriction
BIT STRING ( SIZE ( 192 ) ) ,
                            six-two-TypeI-SinglePanel-Restriction
BIT STRING ( SIZE ( 192 ) ) ,
                            twelve-one-TypeI-SinglePanel-Restriction
BIT STRING ( SIZE ( 48 ) ) ,
                            four-four-TypeI-SinglePanel-Restriction
BIT STRING ( SIZE ( 256 ) ) ,
                            eight-two-TypeI-SinglePanel-Restriction
BIT STRING ( SIZE ( 256 ) ) ,
                            sixteen-one-TypeI-SinglePanel-Restriction
BIT STRING ( SIZE ( 64) )
                        } ,
                        typeI-SinglePanel-codebookSubsetRestriction-i2
BIT STRING ( SIZE ( 16 ) )   OPTIONAL      -- Need R
                      }
                    } ,
                    typeI-SinglePanel-ri-Restriction                BIT
STRING ( SIZE ( 8 ) )
  },
typeI-SinglePanel-r18                            SEQUENCE {
                    nrOfAntennaConfig-r18                   INTEGER
( 1 . . N ) ,
                    AntennaConfig-r18                       SEQUENCE
( SIZE ( 1 . . nrOfAntennaConfig-r18 ) ) OF typeI-SinglePanel
  } ,
```

Table 1 discloses an example RRC message extension to allow configuring multiple hypotheses on the possible antenna port adaptations for Type-I single-panel antenna case. The Type-II single-panel case can be similarly exemplified.

Figure 15:
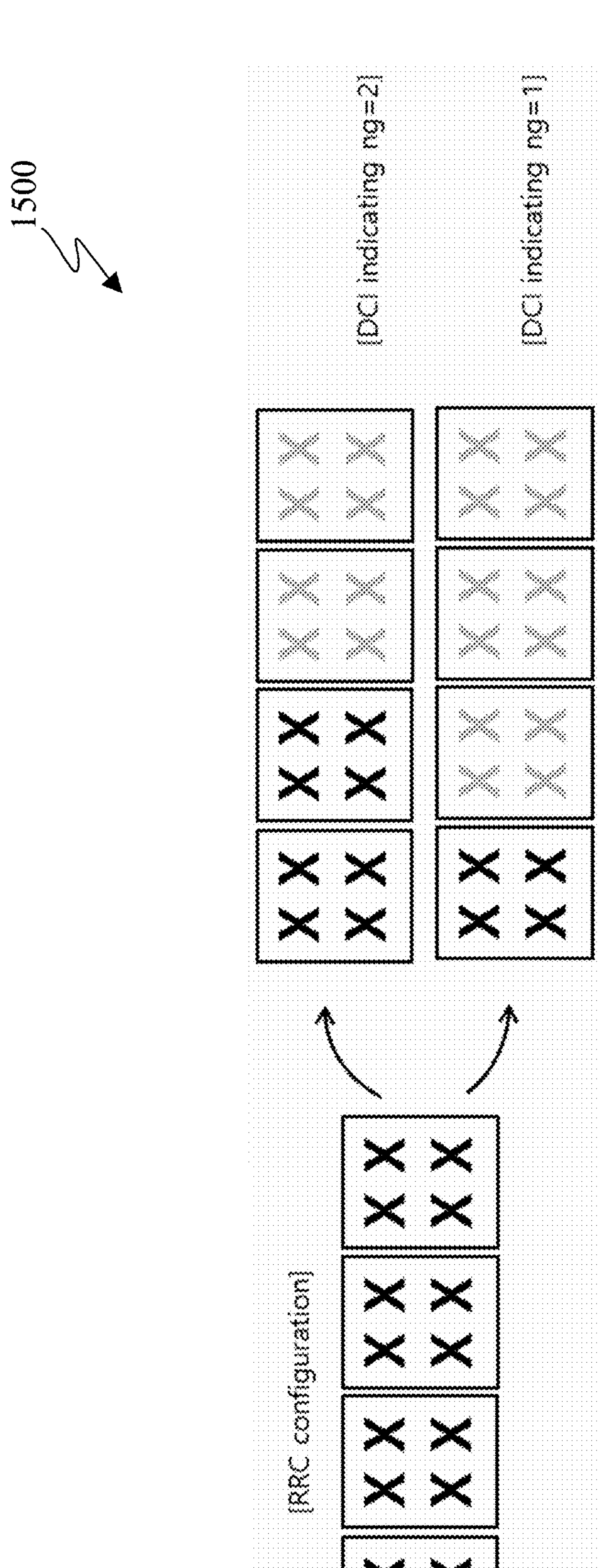
FIG. 15 a block diagram of antenna panel adaptation according to embodiments of the present disclosure.

FIG. 15 illustrates a block diagram 1500 of antenna panel adaptation. The embodiment of the block diagram 1500 illustrated in FIG. 15 is for illustration only. FIG. 15 does not limit the scope of this disclosure to any particular implementation of the antenna panel adaptation shown in block diagram 1500.

For UEs supporting multi-panel antennas, a UE can be indicated by a DCI, e.g., DCI triggering aperiodic CSI, an active number of panels, i.e., ng, which can take values from {one, two, four} and cannot be greater than the RRC configured number of panels. In the CSI report, the UE only sends the co-phase feedback for the indicated number of active panels. When ng=1 is indicated, it becomes a fallback to single-panel (SP) case and the CSI report does not include any co-phase feedback. In this case, a sub-configuration for CSI report corresponding to SP case can be associated with a Type-1 SP codebook, while another sub-configuration for CSI reporting within the same CSI report setting corresponding to multi-panel (MP) case can be associated with a Type-1 MP codebook.

This disclosure provides another method of network energy saving. In this method, the transmission power level of PDSCH at gNB with respect to the CSI-RS transmission power level can be adapted. As the actual transmission power of PDSCH can be different from the measured CSI-RS, the CSI report from the UE needs to be enhanced to inform the serving cell the expected CSI at the adjusted actual transmission power. In one example, a UE can be provided by the serving cell multiple powerControlOffset values, i.e., the PDSCH transmission power offset from CSI-RS power, in the CSI-RS Resource configuration.

For CSI report, a UE calculates multiple CSI assuming RRC configured powerControlOffset values and send in one CSI report. CSI report can be enhanced to reduce the payload size. Alternatively, a UE can be indicated by a DCI, e.g., DCI triggering aperiodic CSI, one or multiple indices of powerControlOffset values from a set of RRC configured structures to derive CSI. The spatial domain adaptation, including antenna ports, panels, TRPs, and/or transceiver chain, can be combined with adaptations for other domains in a unified manner by defining a network operation states described by set of network operation parameters.

For Rel-18 NES UE, allow multiple hypothetical powerControlOffset values to be configured. For CSI report, a UE calculates multiple CSI and send in one CSI report. Differential feedback may be defined for some CSI components, e.g., CQI, to reduce the CSI feedback payload size. Alternatively, a UE can be indicated by a DCI, e.g., DCI triggering aperiodic CSI, one or multiple indices of powerControlOffset value from a set of RRC configured values to derive CSI, e.g., using bitmap.

TABLE 2 presents an example process for enhancement of a RRC message to support PDSCH power adaptation. Table 2 is one example implementation of the above described method.

L1-RSRP based on the CSI-RS by restricting measurement occasions or by adjusting a measurement value according to an indicated offset for a power of a CSI-RS transmission. This disclosure also provides a method and apparatus for a gNB to indicate to a UE hypothetical power offset values relative to an actual power of a RLM-RS transmission and for the UE to provide hypothetical beam failure and/or radio link failure (RLF) reports for the indicated hypothetical power offset values.

The general principle for channel measurement enhancement includes a serving gNB indicating a change in a CSI-RS transmission power to a UE together with a transmission power offset via L1, MAC CE, or RRC information, and the UE computing CSI such as L1-RSRP, CQI by restricting measurement occasions or by adjusting a measurement according to the indicated transmission power offset, and reporting the CSI for the serving cell to the serving gNB.

Figure 16:
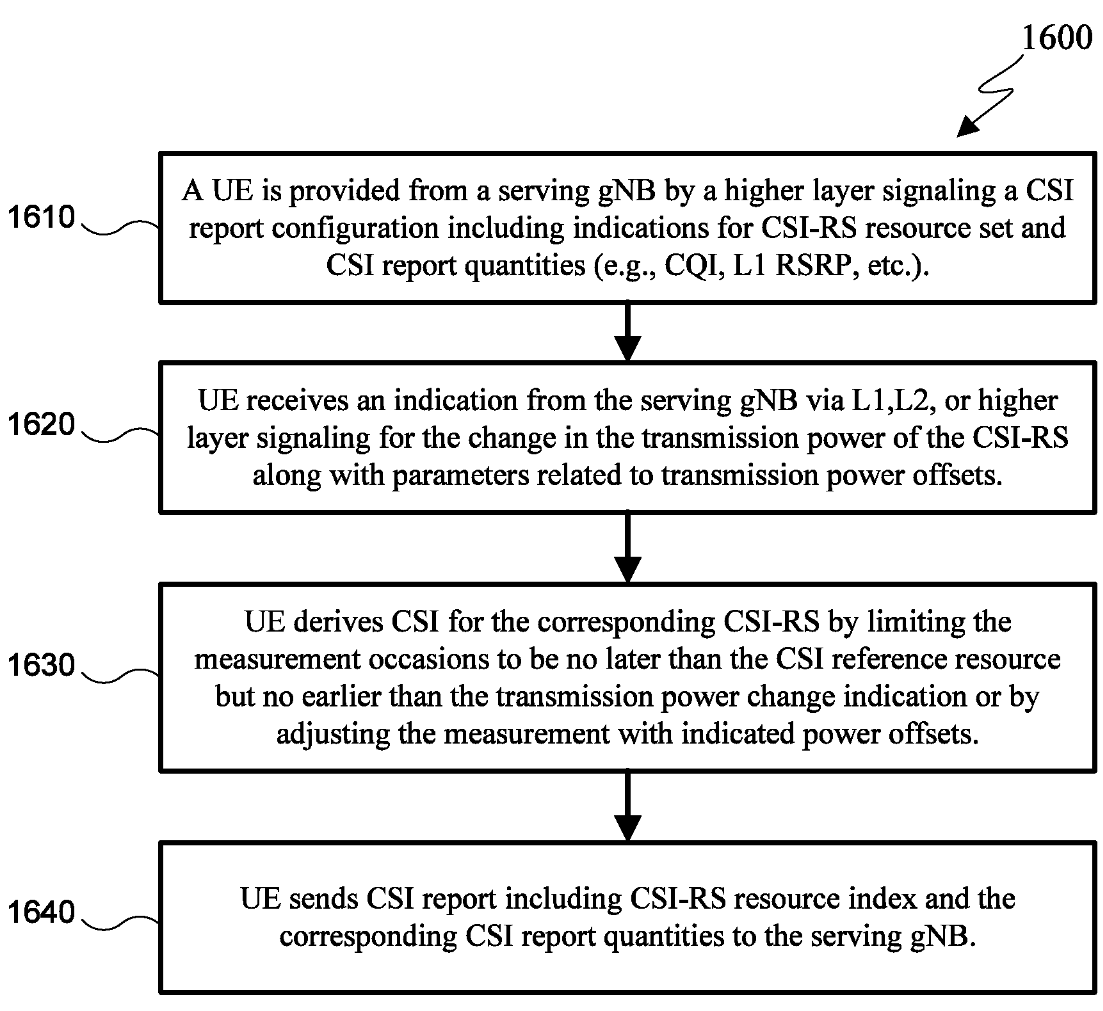
FIG. 16 illustrates a flowchart of a method for a UE to report CSI with CSI-RS transmission power change according to embodiments of the present disclosure.

FIG. 16 illustrates a flowchart of a method 1600 for a UE to receive from a serving gNB an indication for a change/update of a CSI-RS transmission power together with a transmission power offset, compute CSI with measurement restriction or adjustment, and provide the CSI report to the serving gNB according to the disclosure.

At 1610, a UE is provided from a serving gNB by higher layers a CSI report configuration including indications for CSI-RS resource set and CSI report quantities. At 1620, the UE receives an indication from the serving gNB via L1,L2, or higher layer signaling for the change in the transmission power of the CSI-RS along with parameters related to transmission power offsets. At 1630, the UE derives CSI for the corresponding CSI-RS by limiting the measurement occasions to be no later than the CSI reference resource but no earlier than the transmission power change indication or by adjusting the measurement with indicated power offsets. At 1640, UE sends CSI report including CSI-RS resource index and the corresponding CSI report quantities to the serving gNB.

For example, in CSI-ReportConfig, the UE can be indicated by timeRestrictionForChannelMeasurements to enable time domain restriction for channel measurements. If timeRestrictionForChannelMeasurements in CSI-ReportConfig is set to "notConfigured", the UE shall derive the

```
NZP-CSI-RS-Resource ::=              SEQUENCE {
  nzp-CSI-RS-ResourceId                NZP-CSI-RS-ResourceId,
  resourceMapping                      CSI-RS-ResourceMapping,
  powerControlOffset                   INTEGER (-8..15),
  nPowerControlOffsetValues-r18        INTEGER (1..N),
  powerControlOffset-r18               SEQUENCE (SIZE
 (1..nPowerControlOffsetValues-r18)) OF powerControlOffset,
  powerControlOffsetSS                 ENUMERATED { db-3, db0, db3, db6 }
OPTIONAL    -- Need R
  scramblingID                         ScramblingId,
  periodicityAndOffset                 CSI-ResourcePeriodicityAndOffset
OPTIONAL,   -- Cond PeriodicOrSemiPersistent
  qcl-InfoPeriodicCSI-RS               TCI-StateId
OPTIONAL,   -- Cond Periodic
  ...
}
```

In embodiments, as will be described in further details below, this disclosure provides and defines functionalities and procedures for adapting a network operation state in a spatial domain or a power domain. This disclosure also provides a method and apparatus for a gNB to indicate a change in a power of a CSI-RS transmission and for a UE to compute CSI report quantities such as a CQI or a channel measurements for computing CSI value reported in uplink slot n based on only the SS/PBCH or NZP CSI-RS, no later than the CSI reference resource associated with the CSI resource setting. If timeRestrictionForChannelMeasurements in CSI-ReportConfig is set to "Configured", the UE shall derive the channel measurements for computing CSI reported in uplink slot n based on only the most recent, no later than the CSI reference resource, occasion of SS/PBCH or NZP CSI-RS associated with the CSI resource setting. The information by higher layers may also provide a candidate set of CSI-RS transmission powers, such as in terms of powerControlOffsetSS, or a set of +A dB offset values to the indicated powerControlOffsetSS value in the NZP-CSI-RS-Resource configuration.

Figure 17:
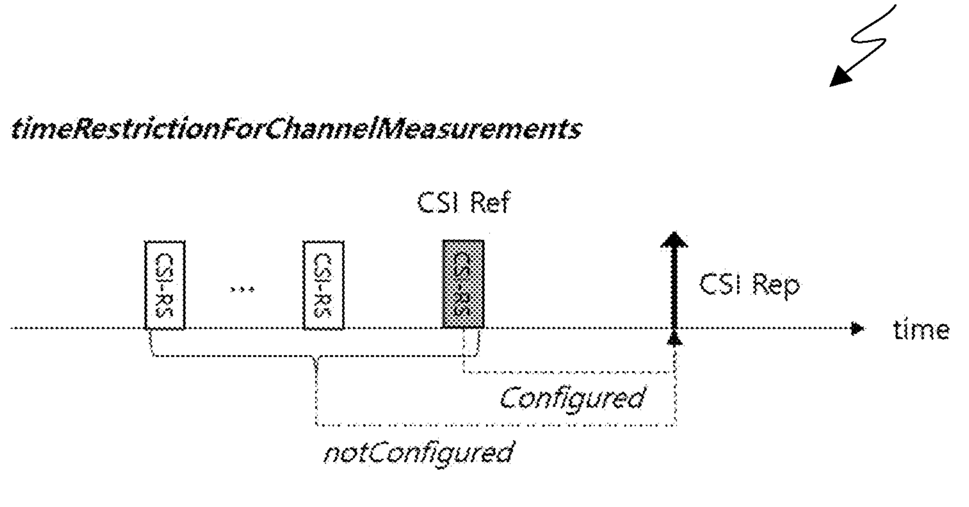
FIG. 17 illustrates a diagram of an example configuration of time domain channel measurement restriction according to embodiments of the present disclosure.

FIG. 17 illustrates a diagram 1700 of an example configuration of time domain channel measurement restriction. The embodiment of the diagram 1700 illustrated in FIG. 17 is for illustration only. FIG. 17 does not limit the scope of this disclosure to any particular implementation of a configuration of time domain channel measurement restriction illustrated in diagram 1700.

As detailed above, the UE receives an indication from the serving gNB via L1, MAC CE, or RRC information for a change/update in a power of CSI-RS transmissions together with parameters related to transmission power offsets at 1620. The indication can be provided by a DCI format, or by a PDSCH scheduled by the DCI format, in a PDCCH reception according to a CSS set or a USS set.

In one example, the UE receives an indication from the serving gNB for an index of CSI-RS resource set, or for a number of indexes of CSI-RS resources within the set, with an indication for a change in a power of CSI-RS transmissions that is provided by DCI together with a corresponding CSI report configuration ID. The UE may be further indicated parameters related to transmission power offsets for the indicated CSI-RS resource set or CSI-RS resources, for example in terms of powerControlOffsetSS, or of an offset value to powerControlOffsetSS, or of an index to the set of candidate values provided by higher layers in step 1610. The DCI may also indicate whether the indication on the change in power of CSI-RS transmissions applies only to a next CSI-RS reference resource, or for a time duration that can be specified or indicated, or until a reception of a next indication for a change in power of CSI-RS transmissions.

A UE may be also provided a CSI calculation method. One method includes limiting CSI calculation to the most recent, no later than the CSI reference resource, occasion of SS/PBCH or NZP CSI-RS associated with the CSI resource setting regardless of time RestrictionForChannelMeasurements configuration in CSI-ReportConfig. Another method includes limiting the CSI calculation to be based on measurements, no later than the CSI reference resource but no earlier than when the UE receives the indication for a change in power of CSI-RS transmissions, occasions of SS/PBCH or NZP CSI-RS associated with the CSI resource setting, if timeRestrictionForChannelMeasurements in CSI-ReportConfig is set to 'notConfigured'. Yet another method includes calculating CSI based on the SS/PBCH or NZP CSI-RS, no later than the CSI reference resource associated with the CSI resource setting, by adjusting each sample measurement of RSRP values by the amount of the indicated power offset values prior to filter samples into single measurement quantity.

An existing DCI format, such as DCI format 0_1, can be extended to include additional fields to indicate those indexes for adjusting a power of CSI-RS transmissions, or a new DCI format can be defined. The indication for the change in power of CSI-RS transmissions can be provided by a UE-group-specific DCI format (provided by PDCCH that a UE monitors according to a CSS set) that can include blocks of information and the UE is provided a starting position for a block via higher layers. The information provided in the block for the UE can include a number of indexes for the multiple CSI reports.

In another example, the UE receives an indication from the serving gNB for an index of CSI-RS resource set, or a number of indexes of CSI-RS resources within the set, with a change in CSI-RS transmission power via a PDSCH providing MAC-CE together with a corresponding CSI report configuration ID. The IEs/fields conveyed over the MAC-CE message can be similar to those described for the DCI case. An existing MAC CE format, e.g., 'SP CSI-RS/CSI-IM Resource Set Activation/Deactivation' MAC CE or 'SP CSI reporting on PUCCH Activation/Deactivation' MAC CE, can be extended to include additional fields to indicate those indexes, or a new MAC CE format can be defined.

In yet another example, the UE is indicated by the serving gNB a time domain pattern for a change in power of CSI-RS transmissions, such as in terms of a periodicity and an offset, together with powerControlOffsetSS for an offset value to the indicated powerControlOffsetSS value by higher layers. The information by higher layers can also include information elements/fields similar to those described for the DCI case.

As detailed above, the UE derives a L1 RSRP based on a corresponding CSI-RS by limiting measurement occasions to be no later than a CSI reference resource and no earlier than a reception occasion for an indication of a change in power of CSI-RS transmissions, or by adjusting the measurement based on indicated power offsets at 1630. According to the indication or based on a pre-configured rule, the UE may limit the CSI calculation to be based on the most recent, no later than the CSI reference resource, occasion of SS/PBCH or NZP CSI-RS associated with the CSI resource setting regardless of time RestrictionForChannelMeasurements configuration in CSI-ReportConfig, limit the CSI calculation to be based on the measurement, no later than the CSI reference resource and no earlier than a reception occasion for a change in power of CSI-RS transmissions, occasions of SS/PBCH or NZP CSI-RS associated with the CSI resource setting, if time RestrictionForChannelMeasurements in CSI-ReportConfig is 'notConfigured', or calculate CSI based on the SS/PBCH or NZP CSI-RS, no later than the CSI reference resource associated with the CSI resource setting, by adjusting each sample measurement of RSRP values by the indicated power offset values prior to filter samples into single measurement quantity.

As detailed above, the UE provides a CSI report, including a CSI-RS resource index and a corresponding L1 RSRP, to the serving gNB 1640.

In embodiments of this disclosure, a general principle for radio link monitoring enhancements includes a serving gNB indicating to a UE a number of hypothetical power offset values relative to an actual RLM-RS transmission power and receiving hypothetical beam failure reports (BFR) or radio link failure (RLF) reports from the UE for the indicated hypothetical power offset values. Based on those BFR or RLF reports, the serving gNB can avoid potential CSI-RS or PDSCH power adjustment that may result in beam failure or RLF.

Figure 18:
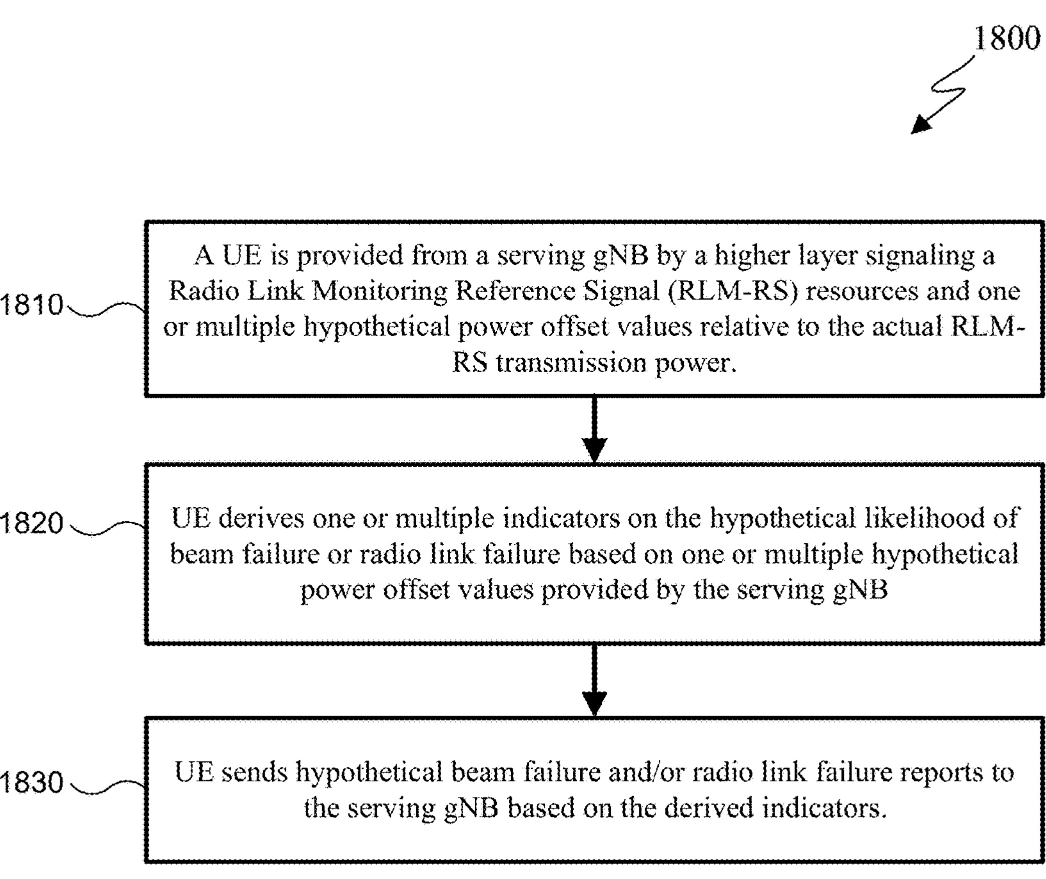
FIG. 18 illustrates a flowchart of a method for a UE to report a hypothetical beam failure and/or a radio link failure report, according to embodiments of the present disclosure.

FIG. 18 illustrates a flowchart of a method 1800 for a UE to report hypothetical beam failure and/or radio link failure report. In embodiments, FIG. 18 illustrates an example method for a UE to receive a number of hypothetical power offset values relative to an actual RLM-RS transmission power and provide hypothetical BFRs or RLF reports to a gNB for a serving cell according to this disclosure. The embodiment of the method 1800 illustrated in FIG. 18 is for illustration only. FIG. 18 does not limit the scope of this disclosure to any particular implementation of the method 1800.

At 1810, a UE is provided from a serving gNB by a higher layer signaling a Radio Link Monitoring Reference Signal (RLM-RS) resources and one or multiple hypothetical power offset values relative to the actual RLM-RS transmission power. At 1820, the UE derives one or multiple indicators on the hypothetical likelihood of beam failure or radio link failure based on one or multiple hypothetical power offset values provided by the serving gNB. At 1830, the UE sends hypothetical beam failure and/or radio link failure reports to the serving gNB based on the derived indicators.

Figure 19:
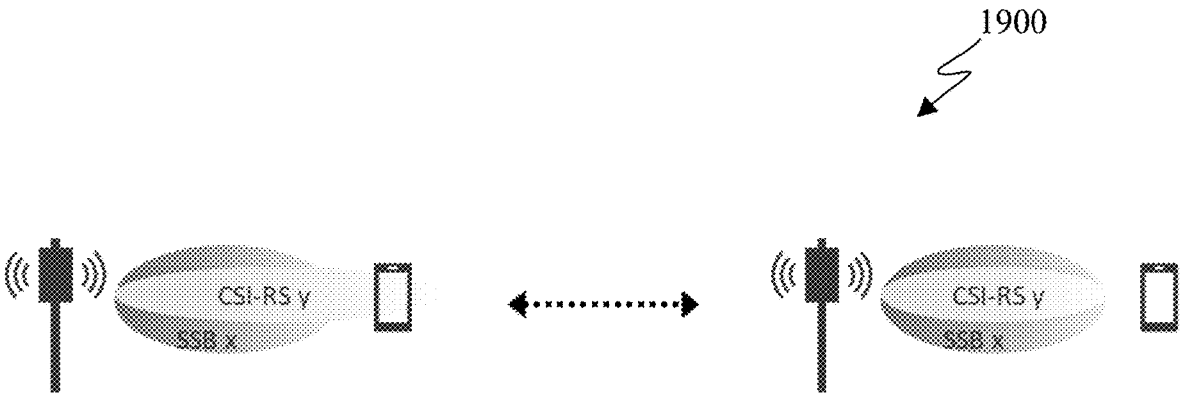
FIG. 19 illustrates a diagram of an example cell/beam coverage reduction due to transmission power adjustment according to embodiments of the present disclosure.

FIG. 19 illustrates a diagram 1900 of an example cell/beam coverage reduction dure to transmission power adjustment. The embodiment of the diagram 1900 illustrated in FIG. 19 is for illustration only. FIG. 19 does not limit the scope of this disclosure to any particular implementation.

A UE is provided, from a serving gNB by higher layers, resources for a Radio Link Monitoring Reference Signal (RLM-RS) and a number of hypothetical power offset values relative to an actual RLM-RS transmission power, at 1810. The serving gNB can provide to the UE a set of RLM-RS resources, that can include SSBs, CSI-RSs, or a combination of SSBs and CSI-RSs, where a purpose for each RLM-RS is indicated to be for beam failure detection, RLM, or both. For an RLM-RS resource, the UE can be provided from the serving gNB a number of hypothetical power offset values relative to the actual RLM-RS transmission power. As an example, if SSB is configured as an RLM-RS resource, the actual SSB transmission power is indicated by ss-PDCH-BlockPower in ServingCellConfigCommonSIB. The number of hypothetical power offset values can be set relative to the ss-PDCH-BlockPower value and indicated to the UE. As another example, if CSI-RS is configured as an RLM-RS resource, the actual CSI-RS transmission power is indicated by powerControlOffsetSS, relative to ss-PDCH-BlockPower, in the NZP-CSI-RS-Resource. The one or multiple hypothetical power offset values can be set relative to the actual CSI-RS transmission power and indicated to the UE, and can be interpreted either as a hypothetical CSI-RS transmission power or as a hypothetical PDSCH transmission power relative to the CSI-RS transmission power, i.e., either powerControlOffsetSS or powerControlOffset.

The gNB can indicate to the UE a hypothetical power offset value for each RLM-RS resource, or an indicated value may apply to all configured RLM-RS resources, or a number of hypothetical power offset values can apply for corresponding subsets of RLM-RS resources where a mapping can be indicated by higher layers.

In another example, a serving gNB does not configure any reference signals as RLM-RS and indicates a number of hypothetical power offset values. In this case, the RLM-RS is implicitly assumed to be the RSs linked to active TCI states for a CORESET where the UE receives the PDCCH providing the DCI format that indicates the number of transmission power offsets that are interpreted relative to a power for the assumed RSs.

The UE derives a number of indicators on the hypothetical likelihood of beam failure or RLF based on a number of hypothetical power offset values provided by the serving gNB, at 1820. In one example, such an indicator can be an RSRP, RSRQ, or SINR. In another example, such an indicator can be a hypothetical PDCCH BLER assuming certain PDCCH transmission parameters such as DCI format 1_0 with Control Channel Element (CCE) aggregation level of 8 and a CORESET spanning 2 symbols. In another example, such an indication can be an occurrence of a hypothetical failure instance that is generated when the UE evaluates that a radio link quality of all the monitored RLM-RS is worse than a threshold when applying the indicated hypothetical power offset values. The threshold can be set for RSRP, RSRQ, SINR or hypothetical PDCCH BLER assuming certain PDCCH transmission parameters.

The UE reports a hypothetical beam failure or RLF to the serving gNB based on the derived indicators, at 1830. In one example, the report includes all indicators on a hypothetical likelihood of beam failure or RLF calculated by the UE in step 1820 based on power offset values provided by the serving gNB. In another example, the UE is provided by the serving gNB thresholds for reporting the derived indicators, such that the UE reports indicators worse than the provided thresholds with corresponding RLM-RS index and/or the hypothetical power offset index. The threshold can be set to a RSRP, RSRQ, SINR or hypothetical PDCCH BLER based on an assumption for certain PDCCH transmission parameters. In yet another example, the UE provides the report only when there is an occurrence of hypothetical failure instance as described earlier together with the corresponding RLM-RS index or the hypothetical power offset index.

Any of the above variation embodiments can be utilized independently or in combination with at least one other variation embodiment.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method for a user equipment (UE), the method comprising:
 receiving:
  first information related to reception of reference signals (RSs), wherein:
   the RSs include channel state information RSs (CSI-RS) or synchronization signals,
   the RSs are associated with a beam failure (BF) detection, a radio link failure (RLF) detection, or a CSI report, second information related to hypothetical adaptation of transmission powers of the RSs, and the RSs based on the first information;

determining, based on the second information and the reception of the RSs, reporting quantities indicating hypothetical channel conditions; and transmitting a channel with the reporting quantities indicating the hypothetical channel conditions.

2. The method of claim 1, wherein:

the second information includes offset values to actual transmission powers of the RSS, and the offset values are separately signaled and applied to respective RSs or commonly signaled and applied to all of the RSs related to the first information.

3. The method of claim 1, wherein the reporting quantities indicate information related to a hypothetical BF or RLF and include at least one of:

a reference signal received power (RSRP), a reference signal received quality (RSRQ), a signal to interference and noise ratio (SINR), and a block error rate (BLER) of a hypothetical physical downlink control channel (PDCCH) reception.

4. The method of claim 1, wherein the reporting quantities indicate an occurrence of a BF instance or an RLF instance at the hypothetical adaptation of transmission powers of the RSs.

5. The method of claim 1, further comprising:

receiving third information related to determination of the reporting quantities including one or more conditions for transmitting the reporting quantities indicating a hypothetical BF or RLF, wherein transmitting the channel with the reporting quantities further comprises transmitting the channel with the reporting quantities indicating the hypothetical BF or RLF at the hypothetical adaptation of transmission powers of the RSs satisfying the one or more conditions.

6. The method of claim 1, further comprising:

receiving an indication on an actual adaptation of transmission powers of one or more RSs; and determining a CSI report associated with the one or more RSs based on the actual adaptation of transmission powers of the one or more RSs.

7. The method of claim 1, further comprising:

receiving an indication on an actual adaptation of transmission powers of one or more RSs; and determining a CSI report associated with the one or more RSs based on occasions of the one or more RSs received (i) no later than a CSI reference resource and (ii) no earlier than the reception of the indication on the actual adaptation of transmission powers of the one or more RSs.

8. A user equipment (UE) comprising:

a transceiver configured to receive:

first information related to reception of reference signals (RSs), wherein:

the RSs include channel state information RSs (CSI-RS) or synchronization signals, the RSs are associated with a beam failure (BF) detection, a radio link failure (RLF) detection, or a CSI report, second information related to hypothetical adaptation of transmission powers of the RSs, and the RSs based on the first information; and a processor operably coupled with the transceiver, the processor configured to determine, based on the second information and the reception of the RSs, reporting quantities indicating hypothetical channel conditions, wherein the transceiver is further configured to transmit a channel with the reporting quantities indicating the hypothetical channel conditions.

9. The UE of claim 8, wherein:

the second information includes offset values to actual transmission powers of the RSs, and the offset values are separately signaled and applied to respective RSs or commonly signaled and applied to all of the RSs related to the first information.

10. The UE of claim 8, wherein the reporting quantities indicate information related to a hypothetical BF or RLF and include at least one of:

a reference signal received power (RSRP), a reference signal received quality (RSRQ), a signal to interference and noise ratio (SINR), and a block error rate (BLER) of a hypothetical physical downlink control channel (PDCCH) reception.

11. The UE of claim 8, wherein the reporting quantities indicate an occurrence of a BF instance or an RLF instance at the hypothetical adaptation of transmission powers of the RSs.

12. The UE of claim 8, wherein the transceiver is further configured to:

receive third information related to determination of the reporting quantities including one or more conditions for transmitting the reporting quantities indicating a hypothetical BF or RLF, and transmit the channel with the reporting quantities indicating the hypothetical BF or RLF at the hypothetical adaptation of transmission powers of the RSs satisfying the one or more conditions.

13. The UE of claim 8, wherein:

the transceiver is further configured to receive an indication on an actual adaptation of transmission powers of one or more RSs; and the processor is further configured to determine a CSI report associated with the one or more RSs based on the actual adaptation of transmission powers of the one or more RSs.

14. The UE of claim 8, wherein:

the transceiver is further configured to receive an indication on an actual adaptation of transmission powers of one or more RSs; and the processor is further configured to determine a CSI report associated with the one or more RSs based on occasions of the one or more RSs received (i) no later than a CSI reference resource and (ii) no earlier than the reception of the indication on the actual adaptation of transmission powers of the one or more RSs.

15. A base station (BS) comprising:

a processor; and a transceiver operably coupled with the processor, the transceiver configured to:

transmit first information related to reception of reference signals (RSs), wherein:

the RSs include channel state information RSs (CSI-RS) or synchronization signals, the RSs are associated with a beam failure (BF) detection, a radio link failure (RLF) detection, or a CSI report, transmit second information related to hypothetical adaptation of transmission powers of the RSs, transmit the RSs based on the first information, and receive a channel with reporting quantities indicating hypothetical channel conditions, the reporting quantities based on the second information and the RSs.

16. The BS of claim 15, wherein:

the second information includes offset values to actual transmission powers of the RSS, and the offset values are separately signaled and applied to respective RSs or commonly signaled and applied to all of the RSs related to the first information.

17. The BS of claim 15, wherein the reporting quantities indicate information related to a hypothetical BF or RLF and include at least one of:

a reference signal received power (RSRP), a reference signal received quality (RSRQ), a signal to interference and noise ratio (SINR), and a block error rate (BLER) of a hypothetical physical downlink control channel (PDCCH) reception.

18. The BS of claim 15, wherein the reporting quantities indicate an occurrence of a BF instance or an RLF instance at the hypothetical adaptation of transmission powers of the RSs.

19. The BS of claim 15, wherein the transceiver is further configured to:

transmit third information related to determination of the reporting quantities including one or more conditions for transmitting the reporting quantities indicating a hypothetical BF or RLF, and receive the channel with the reporting quantities indicating the hypothetical BF or RLF at the hypothetical adaptation of transmission powers of the RSs satisfying the one or more conditions.

20. The BS of claim 15, wherein the transceiver is further configured to:

transmit an indication on an actual adaptation of transmission powers of one or more RSs; and receive a CSI report associated with the one or more RSs, the CSI report based on the actual adaptation of transmission powers of the one or more RSs.

* * * * *